United States Patent
Shen et al.

(10) Patent No.: US 8,254,483 B1
(45) Date of Patent: *Aug. 28, 2012

(54) TRANSMISSION OF ACK/NACK BITS AND THEIR EMBEDDING IN THE CQI REFERENCE SIGNAL

(75) Inventors: Zukang Shen, Richardson, TX (US);
Tarik Muharemovic, Dallas, TX (US);
Pierre Bertrand, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/438,584

(22) Filed: Apr. 3, 2012

Related U.S. Application Data

(63) Continuation of application No. 12/183,242, filed on Jul. 31, 2008, now Pat. No. 8,149,938.

(60) Provisional application No. 60/954,355, filed on Aug. 7, 2007, provisional application No. 60/976,720, filed on Oct. 1, 2007, provisional application No. 60/978,644, filed on Oct. 9, 2007, provisional application No. 61/022,878, filed on Jan. 23, 2008.

(51) Int. Cl.
*H04L 23/02* (2006.01)

(52) U.S. Cl. ........ 375/261; 375/295; 375/298; 370/207; 370/208; 714/748; 714/750; 455/69

(58) Field of Classification Search .................. 370/203, 370/204, 206–208, 210, 252, 344, 347, 348, 370/500, 509, 522, 525, 528; 375/261, 295, 375/298, 358, 377; 332/103; 714/746–751; 455/67.11, 67.13, 68, 69, 70, 422.1, 423, 455/434, 436, 450, 452.2, 502, 509, 513, 455/515, 522

See application file for complete search history.

(56) References Cited

U.S. PATENT DOCUMENTS

| | | | |
|---|---|---|---|
| 7,848,385 B2 * | 12/2010 | Nakao et al. .................. | 375/130 |
| 7,929,415 B2 * | 4/2011 | Kwak et al. .................... | 370/208 |
| 7,965,793 B2 * | 6/2011 | Golitschek Edler Von Elbwart et al. .............................. | 375/308 |
| 2008/0075184 A1 * | 3/2008 | Muharemovic et al. ....... | 375/260 |
| 2009/0022135 A1 * | 1/2009 | Papasakellariou et al. ... | 370/344 |
| 2009/0041139 A1 * | 2/2009 | Cho et al. ...................... | 375/260 |
| 2009/0207725 A1 * | 8/2009 | Zhang .......................... | 370/203 |
| 2009/0225700 A1 * | 9/2009 | Shen et al. .................... | 370/328 |
| 2009/0245421 A1 * | 10/2009 | Montojo et al. ............... | 375/298 |
| 2010/0135273 A1 * | 6/2010 | Kim ............................. | 370/344 |
| 2011/0090825 A1 * | 4/2011 | Papasakellariou et al. ... | 370/280 |

* cited by examiner

*Primary Examiner* — Anthony Addy
(74) *Attorney, Agent, or Firm* — Robert D. Marshall, Jr.; Wade James Brady, III; Frederick J. Telecky, Jr.

(57) ABSTRACT

A transmission within a wireless cellular network may include a first and second type of information. A subframe includes a plurality of symbols, at least one symbol is designated as a data symbol and at least one symbol is designated as a reference signal symbol that contains a pre-defined reference signal. The first type of information is embedded in the data symbols. If the second type of data is expected, then the second type of information is embedded in at least one reference symbol by quadrature amplitude modulating the pre-defined reference signal. The subframe is then transmitted from one node in the network to a second node. If it is determined that the second node is not expecting the second type of information, then a discontinuous transmission (DTX) response is embedded in the reference symbol instead of the second type of information.

9 Claims, 10 Drawing Sheets

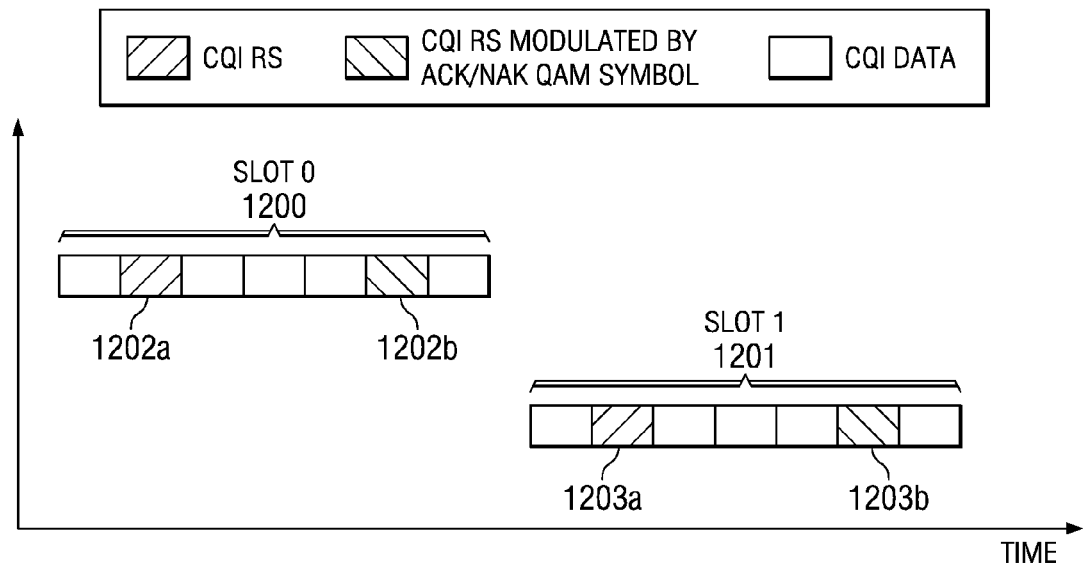
FIG. 12
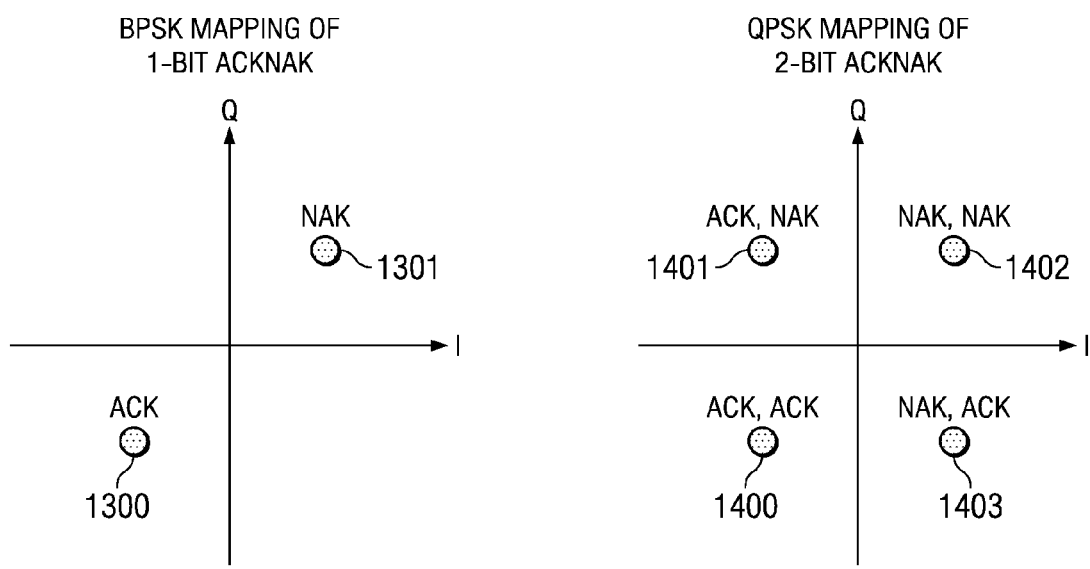
FIG. 13
FIG. 14

TRANSMISSION OF ACK/NACK BITS AND THEIR EMBEDDING IN THE CQI REFERENCE SIGNAL

CLAIM OF PRIORITY

This application is a continuation of U.S. application Ser. No. 12/183,242 entitled "Transmission of ACK/NACK Bits and their Embedding in the CQI Reference Signal" filed Jul. 31, 2008, now U.S. Pat. No. 8,149,938, incorporated by reference herein. This application for Patent claims priority to U.S. Provisional Application No. 60/954,355 entitled "Embedding ACK/NAK Bits in CQI Reference Signals" filed Aug. 7, 2007, incorporated by reference herein. This application for Patent claims priority to U.S. Provisional Application No. 60/976,720 entitled "Embedding ACK/NAK in CQI Reference Signal with DTX Detection" filed Oct. 1, 2007, incorporated by reference herein. This application for Patent claims priority to U.S. Provisional Application No. 60/978,644 entitled "Embedding ACK/NAK in CQI Reference Signal with DTX Detection" filed Oct. 7, 2007, incorporated by reference herein. This application for Patent also claims priority to U.S. Provisional Application No. 61/022,878 entitled "Embedding ACK/NAK in CQI Reference Signal with DTX Detection" filed Jan. 23, 2008, incorporated by reference herein.

FIELD OF THE INVENTION

This invention generally relates to wireless cellular communication, and in particular to encoding a reference signal in orthogonal frequency division multiple access (OFDMA), DFT-spread OFDMA, and single carrier frequency division multiple access (SC-FDMA) systems.

BACKGROUND OF THE INVENTION

Wireless cellular communication networks incorporate a number of mobile UEs and a number of NodeBs. A NodeB is generally a fixed station, and may also be called a base transceiver system (BTS), an access point (AP), a base station (BS), or some other equivalent terminology. As improvements of networks are made, the NodeB functionality evolves, so a NodeB is sometimes also referred to as an evolved NodeB (eNB). In general, NodeB hardware, when deployed, is fixed and stationary, while the UE hardware is portable.

In contrast to NodeB, the mobile UE can comprise portable hardware. User equipment (UE), also commonly referred to as a terminal or a mobile station, may be fixed or mobile device and may be a wireless device, a cellular phone, a personal digital assistant (PDA), a wireless modem card, and so on. Uplink communication (UL) refers to a communication from the mobile UE to the NodeB, whereas downlink (DL) refers to communication from the NodeB to the mobile UE. Each NodeB contains radio frequency transmitter(s) and the receiver(s) used to communicate directly with the mobiles, which move freely around it. Similarly, each mobile UE contains radio frequency transmitter(s) and the receiver(s) used to communicate directly with the NodeB. In cellular networks, the mobiles cannot communicate directly with each other but have to communicate with the NodeB.

Control information bits are transmitted, for example, in the uplink (UL), for several purposes. For instance, Downlink Hybrid Automatic Repeat ReQuest (HARQ) requires at least one bit of ACK/NACK transmitted in the uplink, indicating successful or failed circular redundancy check(s) (CRC). Moreover, a one bit scheduling request indicator (SRI) is transmitted in uplink, when UE has new data arrival for transmission in uplink. Furthermore, an indicator of downlink channel quality (CQI) needs to be transmitted in the uplink to support mobile UE scheduling in the downlink. While CQI may be transmitted based on a periodic or triggered mechanism, the ACK/NACK needs to be transmitted in a timely manner to support the HARQ operation. Note that ACK/NACK is sometimes denoted as ACKNAK or just simply ACK, or any other equivalent term. As seen from this example, some elements of the control information should be provided additional protection, when compared with other information. For instance, the ACK/NACK information is typically required to be highly reliable in order to support an appropriate and accurate HARQ operation. This uplink control information is typically transmitted using the physical uplink control channel (PUCCH), as defined by the 3GPP working groups (WG), for evolved universal terrestrial radio access (EUTRA). The EUTRA is sometimes also referred to as 3GPP long-term evolution (3GPP LTE). The structure of the PUCCH is designed to provide sufficiently high transmission reliability.

In addition to PUCCH, the EUTRA standard also defines a physical uplink shared channel (PUSCH), intended for transmission of uplink user data. The Physical Uplink Shared Channel (PUSCH) can be dynamically scheduled. This means that time-frequency resources of PUSCH are re-allocated every sub-frame. This (re)allocation is communicated to the mobile UE using the Physical Downlink Control Channel (PDCCH). Alternatively, resources of the PUSCH can be allocated semi-statically, via the mechanism of persistent scheduling. Thus, any given time-frequency PUSCH resource can possibly be used by any mobile UE, depending on the scheduler allocation. Physical Uplink Control Channel (PUCCH) is different than the PUSCH, and the PUCCH is used for transmission of uplink control information (UCI). Frequency resources which are allocated for PUCCH are found at the two extreme edges of the uplink frequency spectrum. In contrast, frequency resources which are used for PUSCH are in between. Since PUSCH is designed for transmission of user data, re-transmissions are possible, and PUSCH is expected to be generally scheduled with less stand-alone sub-frame reliability than PUCCH. The general operations of the physical channels are described in the EUTRA specifications, for example: "$3^{rd}$ Generation Partnership Project; Technical Specification Group Radio Access Network; Evolved Universal Terrestrial Radio Access (E-UTRA); Physical Channels and Modulation (Release 8)."

A reference signal (RS) is a pre-defined signal, pre-known to both transmitter and receiver. The RS can generally be thought of as deterministic from the perspective of both transmitter and receiver. The RS is typically transmitted in order for the receiver to estimate the signal propagation medium. This process is also known as "channel estimation." Thus, an RS can be transmitted to facilitate channel estimation. Upon deriving channel estimates, these estimates are used for demodulation of transmitted information. This type of RS is sometimes referred to as De-Modulation RS or DM RS. Note that RS can also be transmitted for other purposes, such as channel sounding (SRS), synchronization, or any other purpose. Also note that Reference Signal (RS) can be sometimes called the pilot signal, or the training signal, or any other equivalent term.

BRIEF DESCRIPTION OF THE DRAWINGS

Particular embodiments in accordance with the invention will now be described, by way of example only, and with reference to the accompanying drawings:

FIG. 12 is a diagram illustrating two slots of a subframe, where each slot uses the orthogonal structure of FIG. 9;

FIG. 13 is an illustration of a mapping of one ACKNAK bit to a BPSK constellation;

FIG. 14 is an illustration of a mapping of two ACKNAK bits to a QPSK constellation;

DETAILED DESCRIPTION OF EMBODIMENTS OF THE INVENTION

Figure 1:
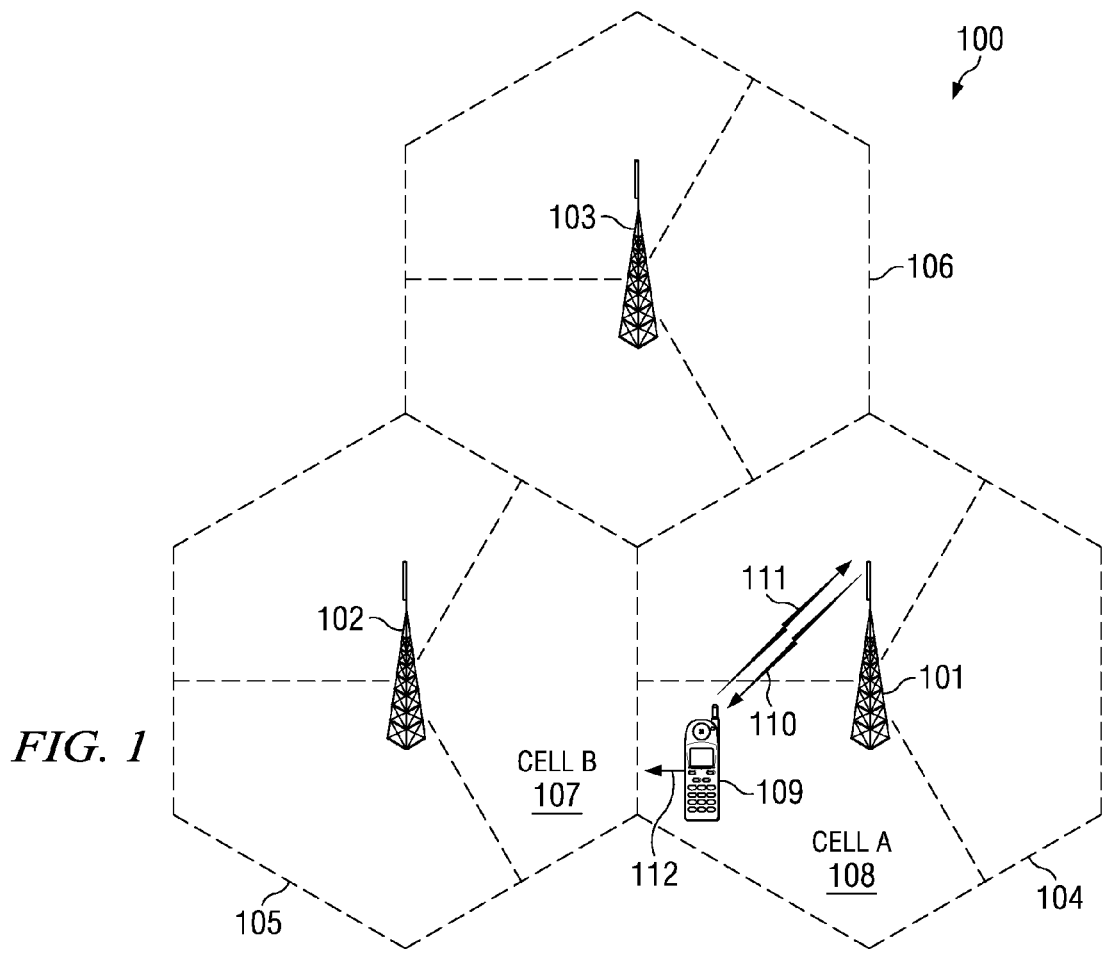
FIG. 1 is a pictorial of an illustrative telecommunications network that employs an embodiment of RS symbols modulated to convey information.

FIG. 1 shows an exemplary wireless telecommunications network 100. The illustrative telecommunications network includes representative base stations 101, 102, and 103; however, a telecommunications network necessarily includes many more base stations. Each of base stations 101, 102, and 103 are operable over corresponding coverage areas 104, 105, and 106. Each base station's coverage area is further divided into cells. In the illustrated network, each base station's coverage area is divided into three cells. Handset or other UE 109 is shown in Cell A 108, which is within coverage area 104 of base station 101. Base station 101 is transmitting to and receiving transmissions from UE 109 via downlink 110 and uplink 111. As UE 109 moves out of Cell A 108, and into Cell B 107, UE 109 may be handed over to base station 102. Because UE 109 is synchronized with base station 101, UE 109 must employ non-synchronized random access to initiate handover to base station 102.

A UE in a cell may be stationary such as within a home or office, or may be moving while a user is walking or riding in a vehicle. UE 109 moves within cell 108 with a velocity 112 relative to base station 102.

Channel quality indicator (CQI) needs to be fed back in uplink (UL) to support dynamic scheduling and multiple-input-multiple-output (MIMO) transmission on downlink (DL). In 3GPP EUTRA, if a UE (user equipment) has no uplink data transmission, its CQI is transmitted on a dedicated UL control channel (i.e. PUCCH). Given that the ACK/NACK needs to be transmitted in a timely manner to support the HARQ operation, in one embodiment of the invention ACKNK may be embedded in one or more of the RS symbols of a CQI transmission.

Figure 2:
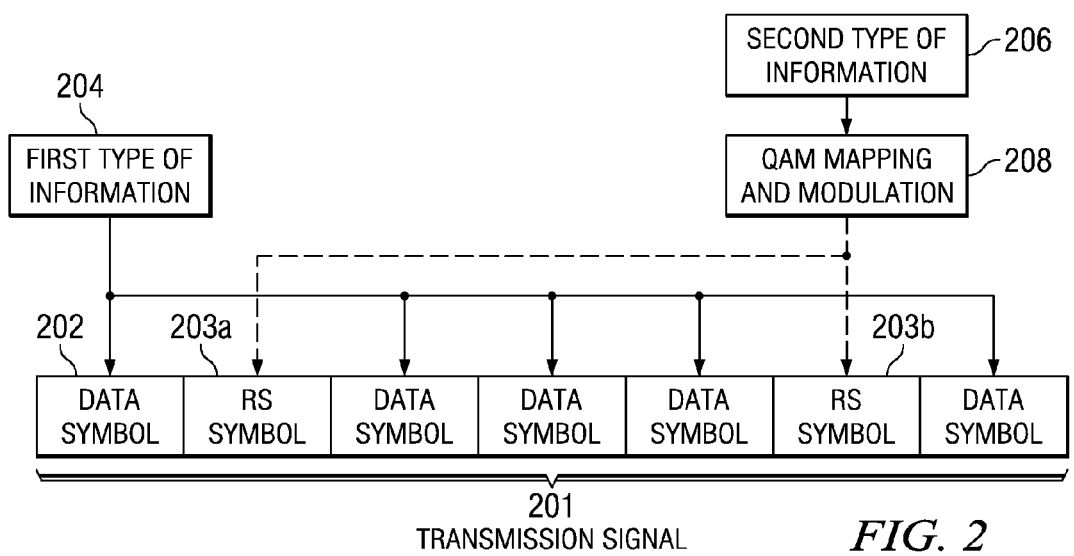
FIG. 2 is a diagram of one embodiment of embedding a first type of information in the data symbols and embedding a second type of information in the RS symbols by quadrature amplitude modulation.

FIG. 2 is a diagram of one embodiment of embedding a first type of information 204 in the data symbols 202 and embedding a second type of information 206 in the RS symbols 203a, 203b. A transmission signal 201 comprises at least one data symbol 202 and at least one RS symbol 203. An exemplary transmission signal comprising five data symbols and two RS symbols is shown in FIG. 2. The first type of information is transmitted in at least one data symbol, and the second type of information is transmitted in at least one RS symbol. The second type of information is firstly mapped 208 to a constellation point according to a mapping scheme, e.g. a quadrature amplitude modulation (QAM) mapping scheme. The produced constellation point mapped from the second type of information is transmitted in at least one RS symbol by modulating/multiplying the RS symbol with the produced constellation point. It is not precluded that the second type of information is mapped to a multiple of constellation points, each of which is transmitted in one RS symbol by modulation/multiplying the reference signal with the corresponding constellation point.

Figure 3:
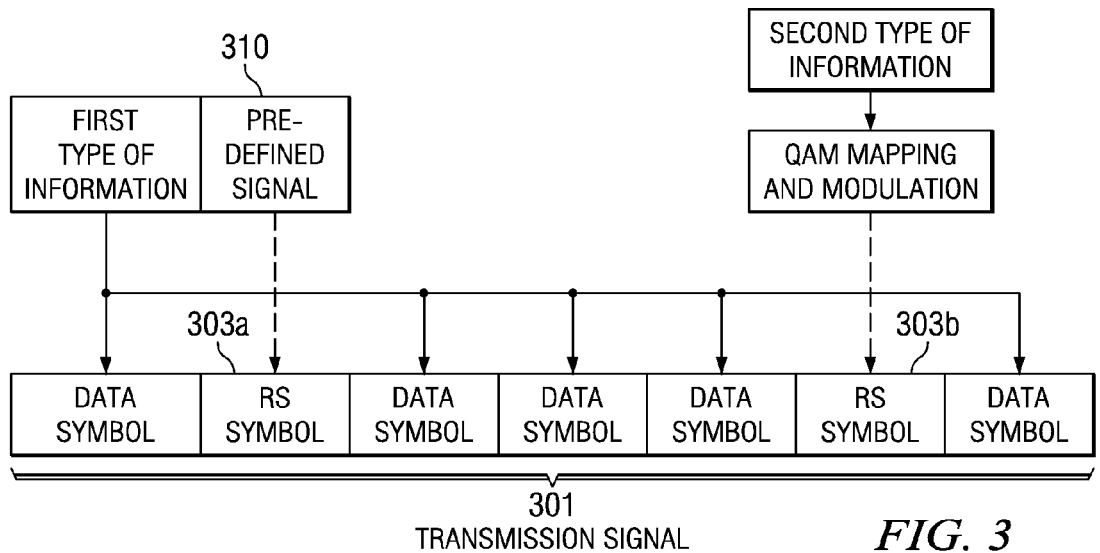
FIG. 3 is a diagram of another embodiment of embedding a second type of information in one RS symbol by quadrature amplitude modulation and inserting a pre-defined signal in another RS symbol.

FIG. 3 is a diagram of another embodiment of the invention. An exemplary transmission signal 301 comprises five data symbol and two RS symbols. The first type of information is transmitted in the data symbols and the second type of information is transmitted in one RS symbol, e.g. the second RS symbol 302b in FIG. 3. The second type of information is firstly mapped to a constellation point according to a mapping scheme, e.g. a quadrature amplitude modulation (QAM) mapping scheme. The produced constellation point mapped from the second type of information is transmitted in the second RS symbol by modulating/multiplying the reference signal with the produced constellation point. A pre-defined reference signal 310 is inserted in the first RS symbol 303a, which can be used to perform channel estimation for coherent demodulation of the first and second type of information. It is not precluded that a transmission signal can comprise more than two RS symbols, where the second type of information is transmitted in a subset of the RS symbols and pre-defined reference signals are transmitted in the rest RS symbols. The pre-defined reference signal transmitted in each RS symbol can be the same. Alternatively, the pre-defined reference signals can be different in different RS symbols, provided these pre-defined reference signals are known to both the transmitter and the receiver.

Figure 4:
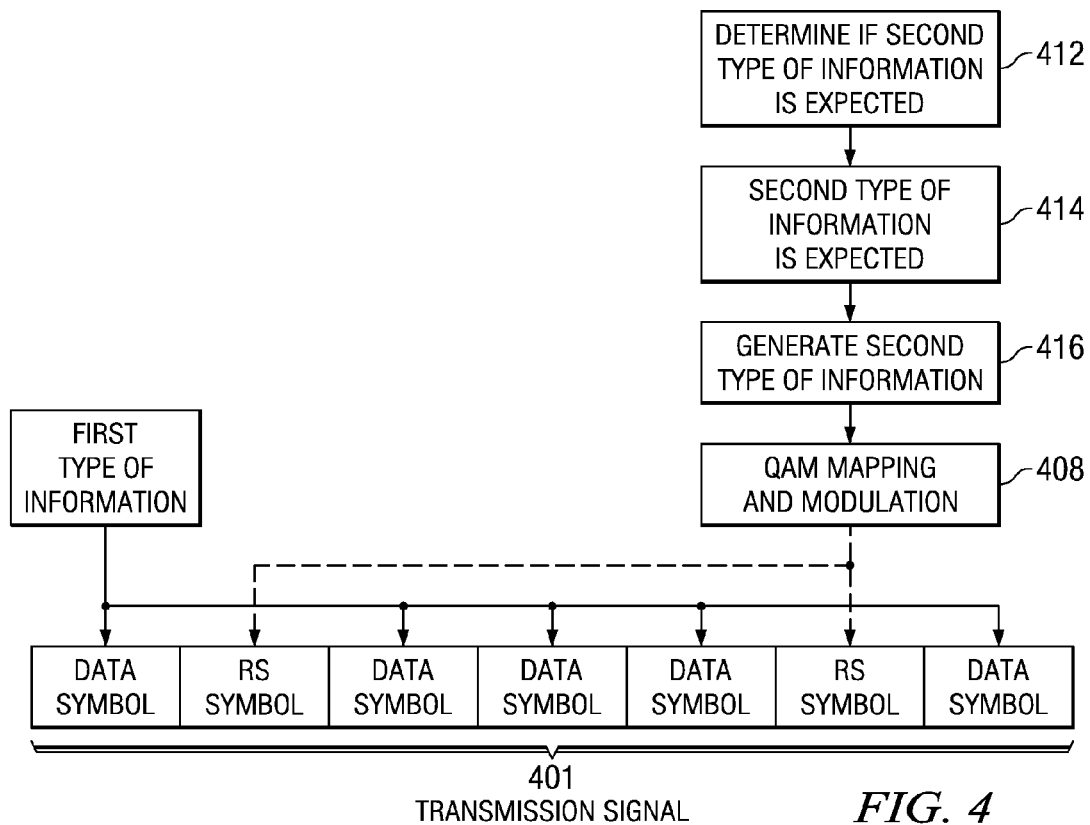
FIGS. 4-6 are diagrams illustrating various embodiments with a process of determining whether a second type of information exists prior to the generation of second type of information.
Figure 5:
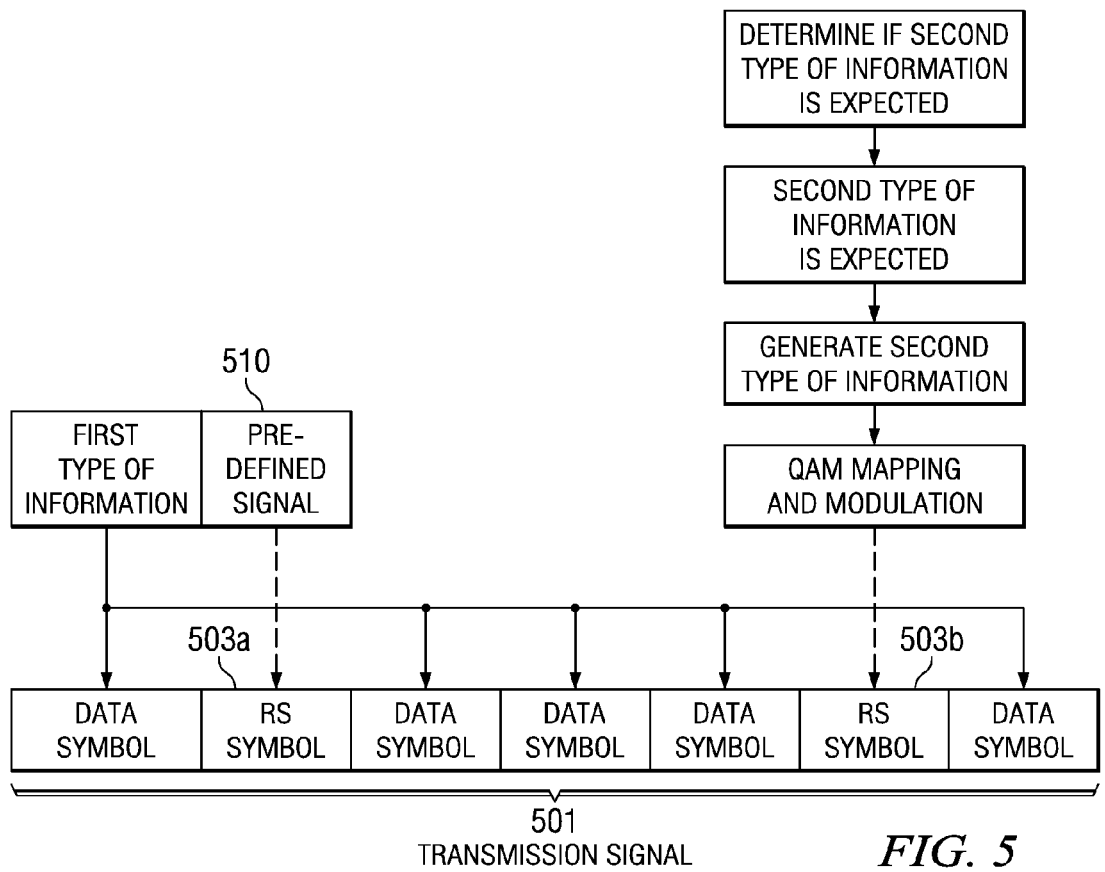
Figure 6:
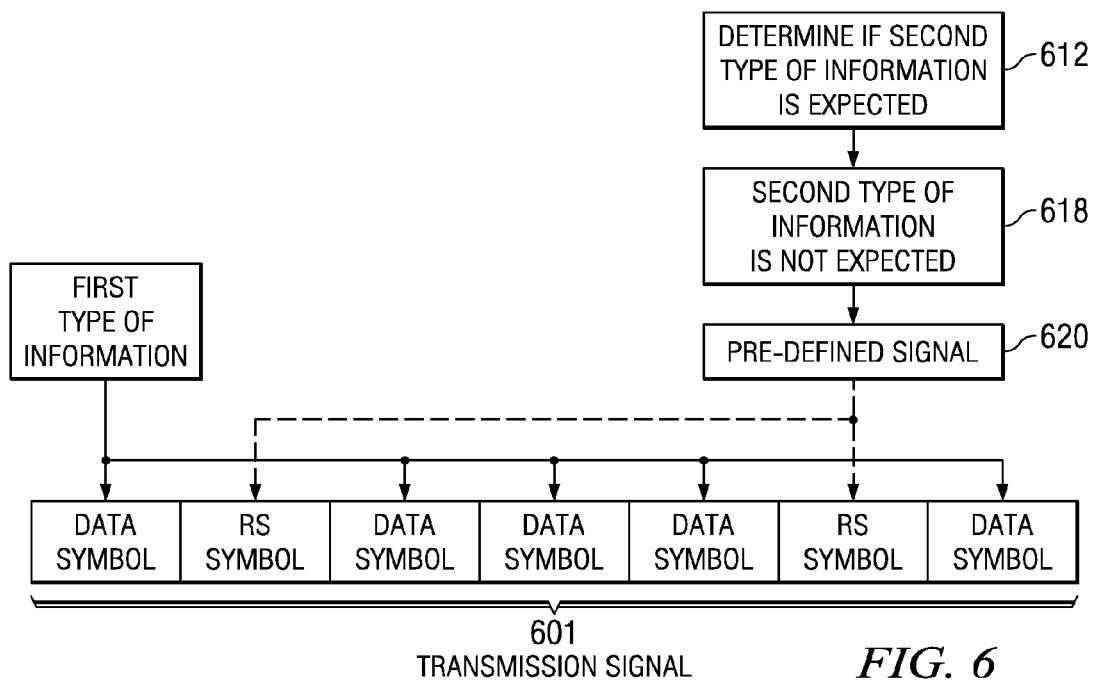

FIGS. 4-6 are diagrams illustrating various embodiments of the invention with a process of determining 412 whether a second type of information exists prior to the generation of second type of information. FIG. 4 shows an embodiment that if the second type of information is expected 414, then generate 416 the second type of information and transmit the generated second type of information in at least one RS symbols by mapping and modulation 408 of one or more reference signals of transmission signal 401, as described in more detail with respect to FIG. 2.

FIG. 5 shows an embodiment in which if the second type of information exists, then generate the second type of information, transmit the second type of information in one of the RS symbols 503b, and insert a pre-defined reference signal 510 in the other RS symbol 503a of transmission signal 501, as was described in more detail with respect to FIG. 3.

FIG. 6 shows an embodiment in which a determination 612 is made that the second type of information does not exist or is not expected 618. In this case, a pre-defined reference signal 620 is inserted in all RS symbols of transmission signal 601. The pre-defined reference signal transmitted in each RS symbol can be the same. Alternatively, the pre-defined reference signals can be different in different RS symbols, provided these pre-defined reference signals are known to both the transmitter and the receiver.

Figure 7:
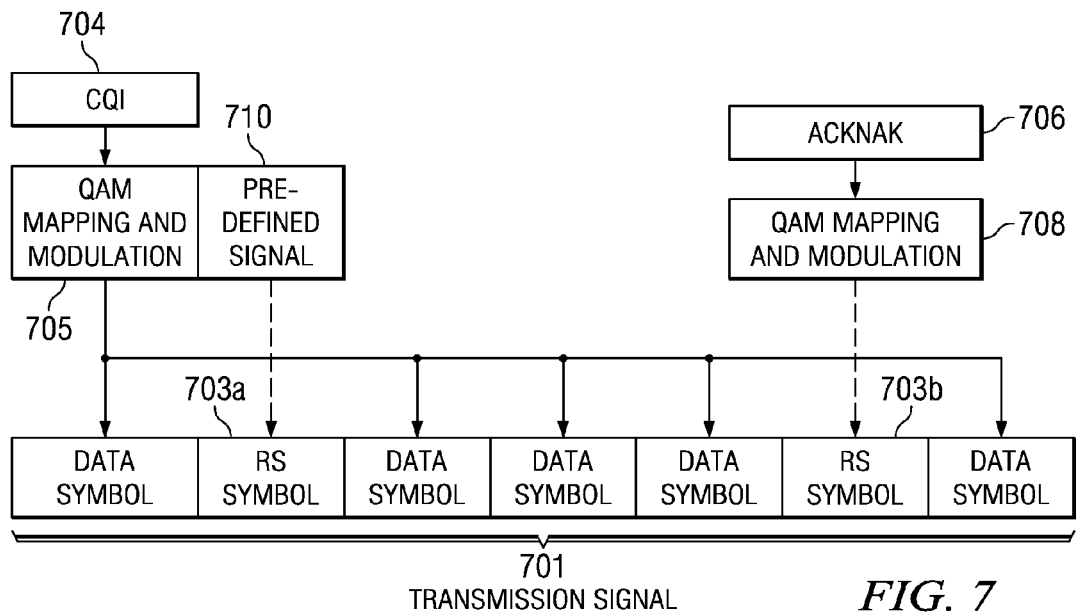
FIG. 7 is a diagram where the first type of information is a channel quality indicator (CQI) and the second type of information is an ACKNAK response.

FIG. 7 is a diagram where the first type of information is a channel quality indicator (CQI) 704 and the second type of information is an ACKNAK response 706. An exemplary transmission signal 701 in FIG. 7 comprises five data symbols and two RS symbols 703a, 703b. The CQI is firstly mapped 705 to a number of constellation points, e.g. according to a quadrature amplitude modulation (QAM) mapping scheme. The constellation points mapped from the CQI are then transmitted on the data symbols, by modulating/multiplying each data symbol with a corresponding constellation point. CQI includes, but not limited to Rank Indicator (RI), Precoding Matrix Indicator (PMI), Modulation and Coding Scheme (MCS), or combinations thereof.

The ACKNAK response 706 is firstly mapped 708 to a constellation point, e.g. according to a quadrature amplitude modulation mapping scheme. The constellation point mapped from the ACKNAK response is transmitted in the second RS symbol 703b by modulating/multiplying the reference signal with the constellation point. A pre-defined reference signal 710 is transmitted in the first RS symbol 703a. It is not precluded that a transmission signal can comprise more than two RS symbols, where the ACKNAK response is transmitted in a subset of the RS symbols and pre-defined reference signals are transmitted in the rest RS symbols. The pre-defined reference signal transmitted in each RS symbol can be the same. Alternatively, the pre-defined reference signals can be different in different RS symbols, provided these pre-defined reference signals are known to both the transmitter and the receiver.

In some embodiments of the invention, said ACKNAK information element is produced by receiving a data packet, followed by performing error detection or error checking on the received data packet. In some embodiments of the invention, the error checking is achieved using a circular redundancy check (CRC), where the CRC can "pass" or "fail." If a CRC "fails" an error detection is declared, whereas if the CRC "passes" a transmission success is declared. If an error is detected, a NAK is transmitted as a specific realization of ACKNAK information element, whereas if no error is detected, an ACK is transmitted as another specific realization of the ACKNAK information element.

Figure 8:
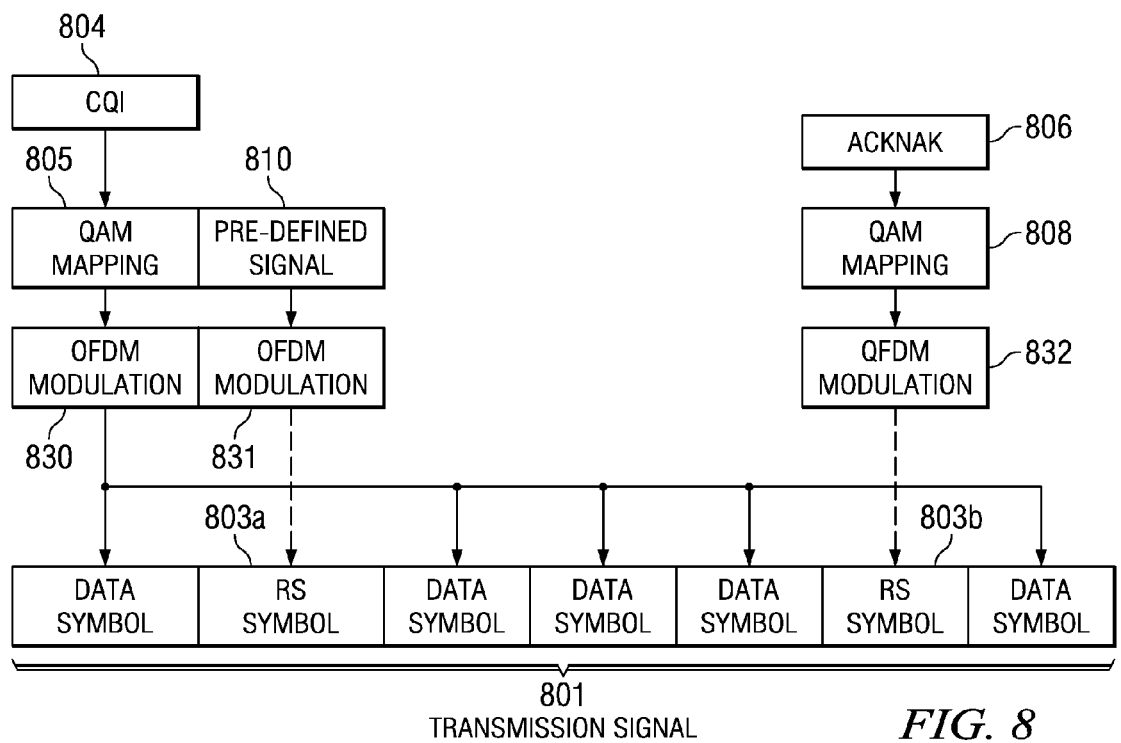
FIG. 8 shows an OFDM modulated first and second type of information.

FIG. 8 illustrates an embodiment of the invention where the first and second types of information are OFDM modulated. An exemplary transmission signal 801 comprises five OFDM data symbols and two OFDM RS symbols 803a, 803b. One embodiment is that the first type of information is a CQI 804 and the second type of information is an ACKNAK response 806. The CQI is firstly mapped 805 to a multiple of constellation points, e.g. according to a quadrature amplitude modulation mapping scheme. Each constellation point mapped from the CQI is used to form an OFDM signal 830, which is transmitted in a corresponding data symbol. CQI includes, but not limited to Rank Indicator (RI), Precoding Matrix Indicator (PMI), Modulation and Coding Scheme (MCS), or combinations thereof.

The ACK/NAK response is firstly mapped 808 to a constellation point, e.g. according to a quadrature amplitude modulation mapping scheme. The constellation point mapped from the ACKNAK response is used to form an OFDM signal 832, which is transmitted in the second RS symbol 803b. A pre-defined signal 810 is used to form a pre-defined OFDM reference signal 831, which is transmitted in the first RS symbol 803a. It is not precluded that a transmission signal can comprise more than two OFDM RS symbols, where the ACKNAK response is transmitted in a subset of the RS symbols and pre-defined OFDM reference signals are transmitted in the rest RS symbols. The pre-defined OFDM reference signal transmitted in each RS symbol can be the same. Alternatively, the pre-defined OFDM reference signals can be different in different RS symbols, provided these pre-defined OFDM reference signals are known to both the transmitter and the receiver.

Figure 9:
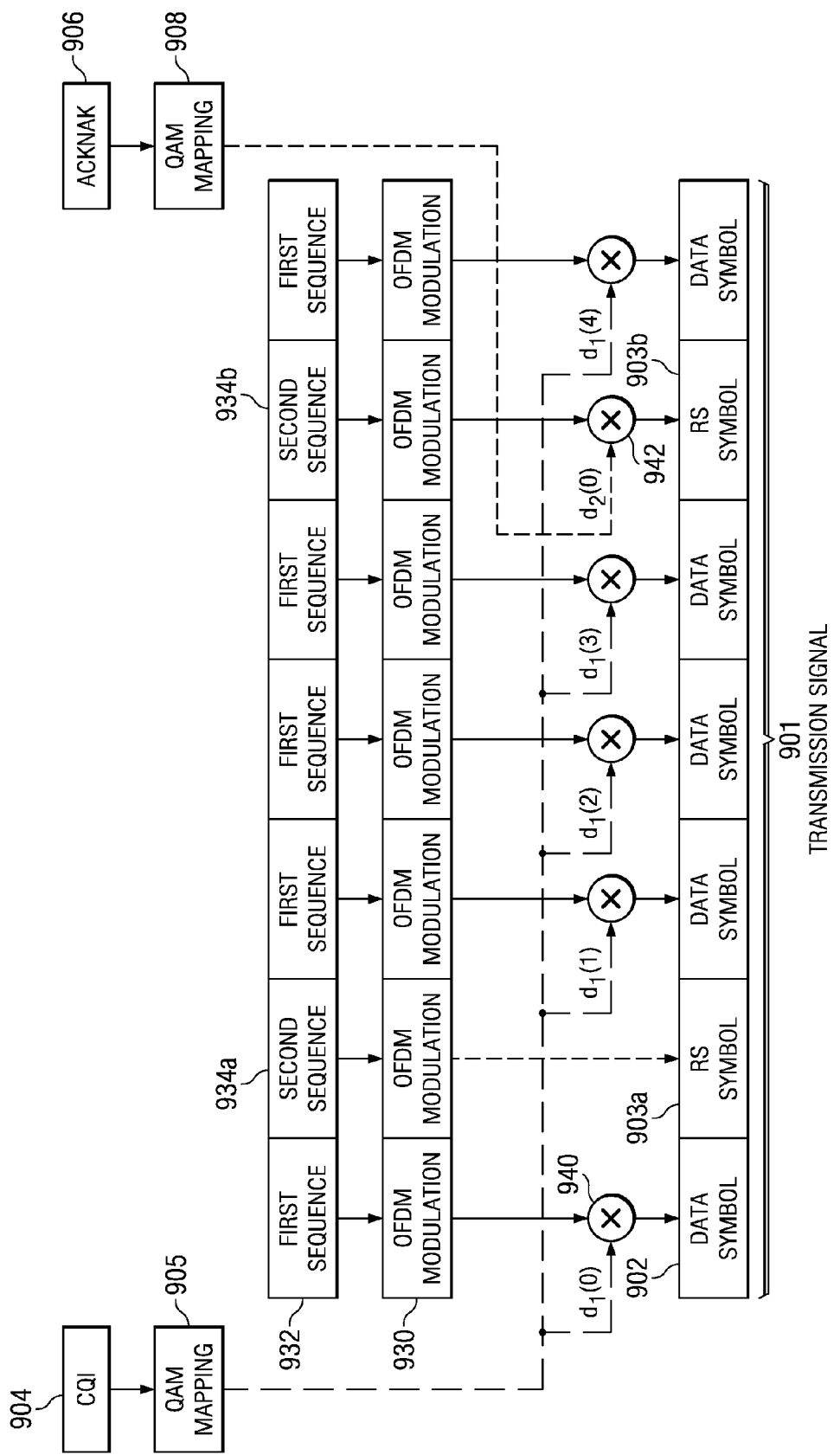
FIG. 9 is a detailed diagram of FIG. 8.

FIG. 9 is a more detailed diagram of FIG. 8. An exemplary transmission signal 901 comprises five OFDM symbols and two OFDM RS symbols 903a, 903b. The CQI 904 is mapped 905 to five QAM constellation points $[d_1(0), d_1(1), d_1(2), d_1(3), d_1(4)]$. A first sequence 932 is generated and used to form an OFDM signal 930. The transmission signal in the R-th data OFDM symbol, indicated generally as 902, is the product of the OFDM modulated first sequence 930 and the R-th constellation point mapped from CQI, i.e. $d_1(R-1)$. The multiplication, indicated generally as 940, of the OFDM modulated first sequence and the R-th constellation point $d_1(R-1)$ is performed such that the entire OFDM modulated first sequence is multiplied with the R-th constellation point $d_1(R-1)$. Note that the first sequence 932 in different data symbols can be different, provided these first sequences are known to both the transmitter and the receiver.

The ACK/NAK response 906 is mapped 908 to a QAM constellation point $d_2(0)$. A second sequence is generated and used to form an OFDM signal. The transmission signal in the second RS symbol 903b is the product of the OFDM modulated second sequence 934b and the constellation point mapped from the ACKNAK response, i.e. $d_2(0)$. The multiplication 942 of the OFDM modulated second sequence and the ACKNAK constellation $d_2(0)$ is performed such that the entire OFDM modulated second sequence is multiplied with $d_2(0)$. A second sequence 934a is generated and used to form a pre-defined OFDM signal, which is transmitted in the first RS symbol 903a. Note that the second sequence in different RS symbols can be different, provided these second sequences are known to both the transmitter and the receiver.

Figure 15:
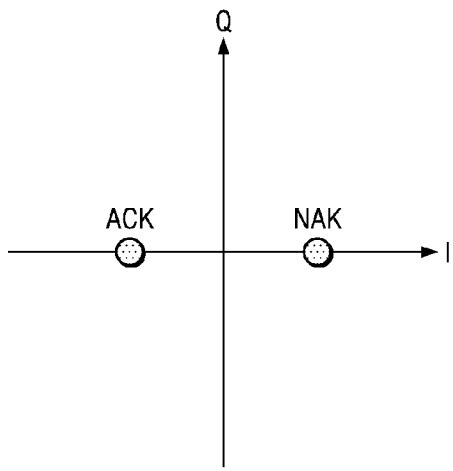
FIG. 15 is an illustration of another mapping of one ACK-NAK bit to a BPSK constellation.

In one embodiment of the invention, the first type of information is a channel quality indicator and the second type of information is a 1-bit ACK/NAK response. The CQI is mapped to a multiple of QAM constellation points, each of which is transmitted in one data OFDM symbol. The 1-bit ACKNAK response is mapped according to a binary phase shift keyed (BPSK) constellation mapping scheme. The generated ACKNAK BPSK constellation is transmitted in one of the RS symbols, as described in more detail with respect to FIG. 9. FIG. 13 is an illustration of a mapping of 1-bit ACKNAK to a rotated BPSK constellation having two constellation points 1300, 1301. FIG. 15 is an illustration of another mapping of 1-bit ACKNAK to a BPSK constellation. Other rotations may be used in other embodiments.

Figure 16:
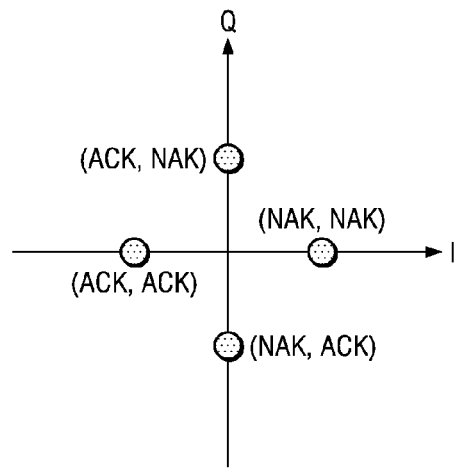
FIG. 16 is an illustration of another mapping of two ACK-NAK bits to a QPSK constellation.

In another embodiment of the invention, the first type of information is a CQI and the second type of information is a 2-bit ACK/NAK response. The CQI is mapped to a multiple of QAM constellation points, each of which is transmitted in one data OFDM symbol. The 2-bit ACKNAK response is mapped according to a quadrature phase shift keyed (QPSK)

constellation mapping scheme. The generated ACKNAK QPSK constellation is transmitted in one of the RS symbols, as described in more detail with respect to FIG. 9. FIG. 14 is an illustration of a mapping of 2-bit ACKNAK to a rotated QPSK constellation having four constellation points 1400-1403. FIG. 16 is an illustration of another mapping of 2-bit ACKNAK to a QPSK constellation. Other embodiments may use a four point constellation with different rotation or configuration.

Figure 10:
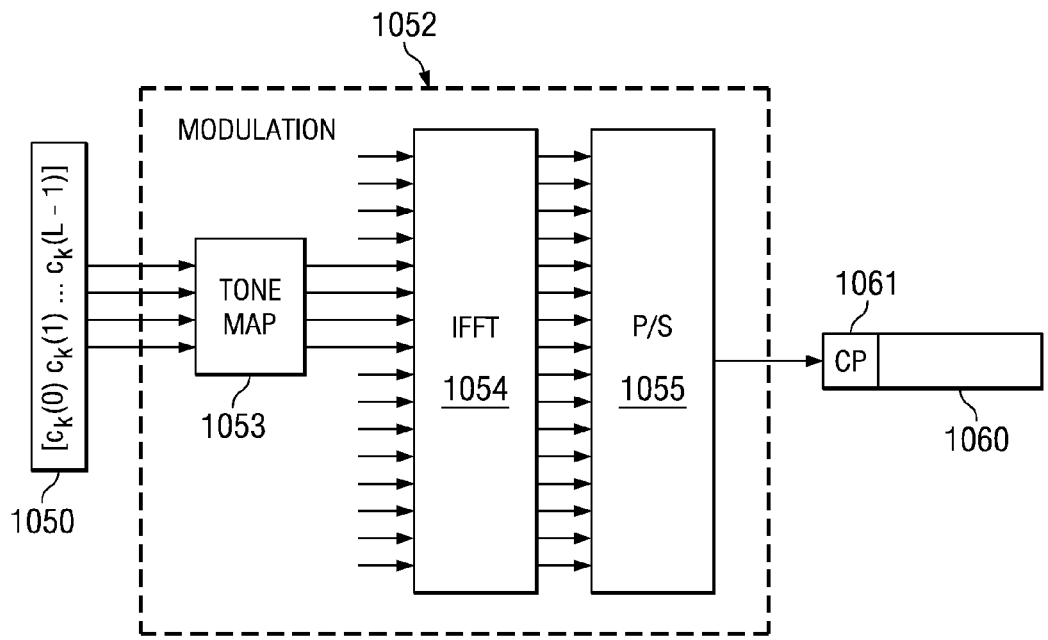
FIG. 10 is a block diagram of OFDMA modulation.

FIG. 10 illustrates a block diagram of modulation of an orthogonal frequency-division multiplexing (OFDM) system. Block $[c_k(0) \ldots c_k(L-1)]$ 1050 denotes the user signal of user k. This user signal includes but is not limited to reference signal, data signal, control signal, and random access preamble. Modulation block 1052 includes tone map 1053, inverse Fast Fourier transform (IFFT) block 154, and parallel-to-serial (P/S) converter 1055. Tone map 1053 maps the user signal onto L sub-carriers in the frequency domain. IFFT block 1054 converts these signals from frequency domain to temporal domain. Copies of modulation block 1052 in FIG. 10 can service a plurality of UEs. The plural signals from the plural UEs are transmitted on different sub-carriers at the same time period as designated by a UE specific tone map 1053. Such a system is sometimes called orthogonal frequency division multiple access (OFDMA) system. These plural user signals and tone maps are omitted for clarity. P/S converter 1055 converts these parallel signals into a single serial signal 1060. A cyclic prefix (CP) 1061 is inserted by repeating a portion of the serial signal.

Figure 11:
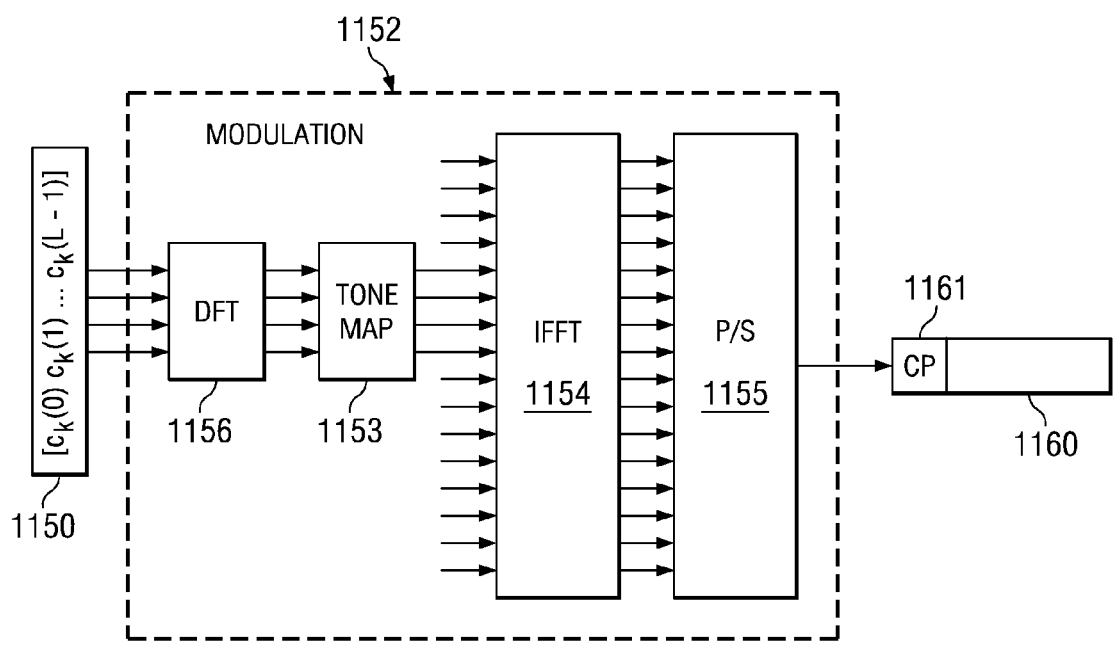
FIG. 11 is a block diagram of SC-OFDMA modulation.

FIG. 11 illustrates an alternate modulation block 1152 to that of FIG. 10. Block $[c_k(0) \ldots c_k(L-1)]$ 1150 denotes the user signal of user k. This user signal includes but not limited to reference signal, data signal and control signal. Modulation block 1152 includes discrete Fourier Transform (DFT) block 1156, tone map 1153, inverse Fast Fourier transform (IFFT) block 1154 and parallel-to-serial (P/S) converter 1155. In FIG. 11, the user signal is first processed by DFT block 1156. Tone map 1153 maps the user signal onto L sub-carriers as described above in conjunction with FIG. 10. IFFT block 1154 converts these signals from frequency domain to temporal domain. Copies of modulation block 1152 in FIG. 11 can service a plurality of UEs. The plural signals from the plural UEs are transmitted on different sub-carriers at the same time period as designated by a UE specific tone map 1153. Such a system is sometimes called single carrier orthogonal frequency division multiple access (SC-OFDMA) system. These plural user signals, DFT blocks and tone maps are omitted for clarity. P/S converter 1156 converts these parallel signals into a single serial signal 1160. A cyclic prefix (CP) 1161 is inserted by repeating a portion of the serial signal.

One embodiment of the user signal $[c_k(0) \ldots c_k(L-1)]$ 1050, 1150 in FIG. 10 or FIG. 11, respectively, is first sequence 932 or second sequence 934 in FIG. 9. One embodiment of $[c_k(0) \ldots c_k(L-1)]$ is a cyclically shifted or phase ramped CAZAC-like sequence. In this disclosure, a CAZAC-like sequence generally refers to any sequence that has the property of constant amplitude zero auto correlation. Examples of CAZAC-like sequences includes but not limited to, Chu Sequences, Frank-Zadoff Sequences, Zadoff-Chu (ZC) Sequences, Generalized Chirp-Like (GCL) Sequences, or any computer generated CAZAC sequences. One example of a CAZAC-like sequence $\bar{r}_{u,v}(n)$ is given by $$\bar{r}_{u,v}(n) = e^{j\phi(n)\pi/4}, 0 \leq n \leq M_{sc}^{RS}-1$$

where $M_{sc}^{RS}=12$ and $\phi(n)$ is defined in Table 1.

In this disclosure, the cyclically shifted or phase ramped CAZAC-like sequence is sometimes denoted as cyclic shifted base sequence, cyclic shifted root sequence, phase ramped base sequence, phase ramped root sequence, or any other equivalent

TABLE 1

Definition of φ(n)

| μ | $\phi(0), \ldots, \phi(11)$ | | | | | | | | | | | |
|---|---|---|---|---|---|---|---|---|---|---|---|---|
| 0  | -1 | 1  | 3  | -3 | 3  | 3  | 1  | 1  | 3  | 1  | -3 | 3  |
| 1  | 1  | 1  | 3  | 3  | 3  | -1 | 1  | -3 | -3 | 1  | -3 | 3  |
| 2  | 1  | 1  | -3 | -3 | -3 | -1 | -3 | -3 | 1  | -3 | 1  | -1 |
| 3  | -1 | 1  | 1  | 1  | 1  | -1 | -3 | -3 | 1  | -3 | 3  | -1 |
| 4  | -1 | 3  | 1  | -1 | 1  | -1 | -3 | -1 | 1  | -1 | 1  | 3  |
| 5  | 1  | -3 | 3  | -1 | -1 | 1  | 1  | -1 | -1 | 3  | -3 | 1  |
| 6  | -1 | 3  | -3 | -3 | -3 | 3  | 1  | -1 | 3  | 3  | -3 | 1  |
| 7  | -3 | -1 | -1 | -1 | 1  | -3 | 3  | -1 | 1  | -3 | 3  | 1  |
| 8  | 1  | -3 | 3  | 1  | -1 | -1 | -1 | 1  | 1  | 3  | -1 | 1  |
| 9  | 1  | -3 | -1 | 3  | 3  | -1 | -3 | 1  | 1  | 1  | 1  | 1  |
| 10 | -1 | 3  | -1 | 1  | 1  | -3 | -3 | -1 | -3 | -3 | 3  | -1 |
| 11 | 3  | 1  | -1 | -1 | 3  | 3  | -3 | 1  | 3  | 1  | 3  | 3  |
| 12 | 1  | -3 | 1  | 1  | -3 | 1  | 1  | 1  | -3 | -3 | -3 | 1  |
| 13 | 3  | 3  | -3 | 3  | -3 | 1  | 1  | 3  | -1 | -3 | 3  | 3  |
| 14 | -3 | 1  | -1 | -3 | -1 | 3  | 1  | 3  | 3  | 3  | -1 | 1  |
| 15 | 3  | -1 | 1  | -3 | -1 | -1 | 1  | 1  | 3  | 1  | -1 | -3 |
| 16 | 1  | 3  | 1  | -1 | 1  | 3  | 3  | 3  | -1 | -1 | 3  | -1 |
| 17 | -3 | 1  | 1  | 3  | -3 | 3  | -3 | -3 | 3  | 1  | 3  | -1 |
| 18 | -3 | 3  | 1  | 1  | -3 | 1  | -3 | -3 | -1 | -1 | 1  | -3 |
| 19 | -1 | 3  | 1  | 3  | 1  | -1 | -1 | 3  | -3 | -1 | -3 | -1 |
| 20 | -1 | -3 | 1  | 1  | 1  | 1  | 3  | 1  | -1 | 1  | -3 | -1 |
| 21 | -1 | 3  | -1 | 1  | -3 | -3 | -3 | -3 | -3 | 1  | -1 | -3 |
| 22 | 1  | 1  | -3 | -3 | -3 | -1 | 3  | -3 | 1  | -3 | 3  | 3  |
| 23 | 1  | 1  | -1 | -3 | -1 | -3 | 1  | -1 | 1  | 3  | -1 | 1  |
| 24 | 1  | 1  | 3  | 1  | 3  | 3  | -1 | 1  | -1 | -3 | -3 | 1  |
| 25 | 1  | -3 | 3  | 3  | 1  | 3  | 3  | 1  | -3 | -1 | -1 | 3  |
| 26 | 1  | 3  | -3 | -3 | 3  | -3 | 1  | -1 | -1 | 3  | -1 | -3 |
| 27 | -3 | -1 | -3 | -1 | -3 | 3  | 1  | -1 | 1  | 3  | -3 | -3 |
| 28 | -1 | 3  | -3 | 3  | -1 | 3  | 3  | -3 | 3  | 3  | -1 | -1 |
| 29 | 3  | -3 | -3 | -1 | -1 | -3 | -1 | 3  | -3 | 3  | 1  | -1 |

The first sequence in different data symbols in FIG. 9 can be different. In one embodiment, the first sequences in different data symbols are cyclic shifted or phase ramped ZACAC-like sequences of a base sequence, with different amounts of cyclic shifts or phase ramps on different data symbols.

The second sequence in different RS symbols in FIG. 9 can be different. In one embodiment, the second sequences in different RS symbols are cyclic shifted or phase ramped ZACAC-like sequences of a base sequence, with different amounts of cyclic shifts or phase ramps on different RS symbols.

In 3GPP EUTRA UL, single carrier OFDMA (SC-OFDMA) is adopted as the transmission scheme due to its low peak-to-average ratio (PAR) or cubic metric (CM) property. In the context of CQI transmission on PUCCH, SC-OFDMA essentially means a UE can only transmit on one cyclic shift at each OFDM symbol to keep the PAR/CM low. For example, in FIG. 9, each UE is assigned with one usable cyclic shift per OFDM symbol.

FIG. 12 is a diagram illustrating two slots 1200, 1201 of a sub-frame of a transmission signal, where each slot uses the orthogonal structure of FIG. 9. The transmission signal in the two slots may occur at different bandwidth, to exploit frequency diversity. In this embodiment, the first type of information is a CQI and the second type of information is an ACKNAK response. In this embodiment, one slot of a transmission of duration 0.5 ms is illustrated in which there are seven OFDM symbols per slot. Each symbol is generated using a cyclic shifted CAZAC-like sequence. The $2^{nd}$ and 6th OFDM symbols of each slot are used as reference signals 1202a, 1202b, respectively for slot 1200, and 1203a, 1203b, respectively, for slot 1201. The rest of the OFDM symbols carry the (coded) CQI bits.

The CQI data symbols convey the (coded) CQI information bits by modulating the cyclic shifted (UE specific) CAZAC sequence with QAM constellation points mapped from the (coded) CQI information bits. Therefore, ten (coded) CQI bits can be transmitted with QPSK in one slot per UE, using the four point constellation as shown in FIG. 14 and FIG. 16, for example. The CQI RS symbols are treated such that the cyclic shifted CAZAC sequence is modulated by 1 to provide channel estimation for coherent demodulation of the CQI data symbols.

ACK/NAK in UL is a 1-bit control response to each DL packet to support hybrid ARQ (HARQ) retransmission. Depending on the number of packets transmitted within one DL subframe, multiple ACK/NAK bits may need to be transmitted by a UE. For example, with multiple-input-multiple-output (MIMO) technology, a UE can be scheduled with simultaneous transmission of two packets within one subframe. Thus, an ACKNAK response of two ACK/NAK bits is needed. In one embodiment of the invention, it is assumed the number of ACK/NAK bits per UE per subframe is either one or two. However, in other embodiments larger numbers of ACK/NAK bits may be accommodated by increasing the QAM modulation order.

The ACKNAK response is mapped to a QAM constellation point, which is transmitted in the second RS symbol in each slot, as shown in FIG. 12. The same mapped ACKNAK QAM constellation point is transmitted in the second RS symbol in both slots of a subframe. It is not precluded that the ACKNAK response is mapped to different constellation points, each of which is transmitted in an RS symbol within the subframe, provided that the ACKNAK mapping scheme is known to both the transmitter and the receiver.

Depending on the ACK/NAK information bits and the number of ACKNAK bits, a certain QAM symbol (BPSK for one ACK/NAK bit and QPSK for two ACKNAK bits) can be obtained to modulate/multiply the cyclic shifted CAZAC sequence in the second CQI RS of a slot.

If a UE has not received a DL packet that requires an ACKNAK response and therefore only CQI to transmit, then in the second CQI RS, it may modulate/multiply the second CQI RS with the "NAK, NAK" or "NAK" QAM symbol. It is beneficial to map the 2-bit "NAK, NAK" response and 1-bit "NAK" response onto the same QAM symbol, in case a DL grant is missed by the UE. For example, the 1-bit "NAK" constellation point in FIG. 13 is the same as the 2-bit "NAK, NAK" constellation point in FIG. 14. Moreover, the 1-bit "NAK" constellation point in FIG. 15 is the same as the 2-bit "NAK, NAK" constellation point in FIG. 16.

The Node-B can have prior knowledge on whether ACK-NAK bits are expected in the second CQI RS or not. If the Node-B knows there are no ACK/NAK bits in the second CQI RS, then it demodulates the second CQI RS by the "NAK, NAK" or "NAK" QAM symbol to provide channel estimation for coherent demodulation of the CQI data symbols. If the Node-B expects ACKNAK bits in the second CQI RS, then it decodes the QAM symbol carried in the second CQI RS with the channel estimation obtained from the first CQI RS. Further, after ACKNAK demodulation and decoding on the second CQI RS, the second RS can also serve as a channel estimate for CQI data symbols. In another embodiment, a joint ACKNAK and CQI decoding can be performed.

Further, in case there are more than two ACKNAK bits or some additional UL control signaling bits (e.g. UL scheduling request) to be transmitted together with CQI, a higher order QAM modulation can be used in the second CQI RS symbol to convey the multiple UL control signaling bits.

Discontinuous Transmission (DTX)

ACK/NAK DTX (discontinuous transmission) refers to the scenario where the UE misses the DL grant and thus does not receive any packet and transmits no ACK/NAK bit in UL. However, the NodeB expects ACK/NAK from the UE. Moreover, the NodeB needs to detect ACK/NAK DTX for proper HARQ operations. Referring again to FIG. 12, a DTX response may also be included in the modulation mapping of the second CQI RS symbol 1202*b*, 1203*b*, respectively, of each slot 1200, 1201.

Figure 17:
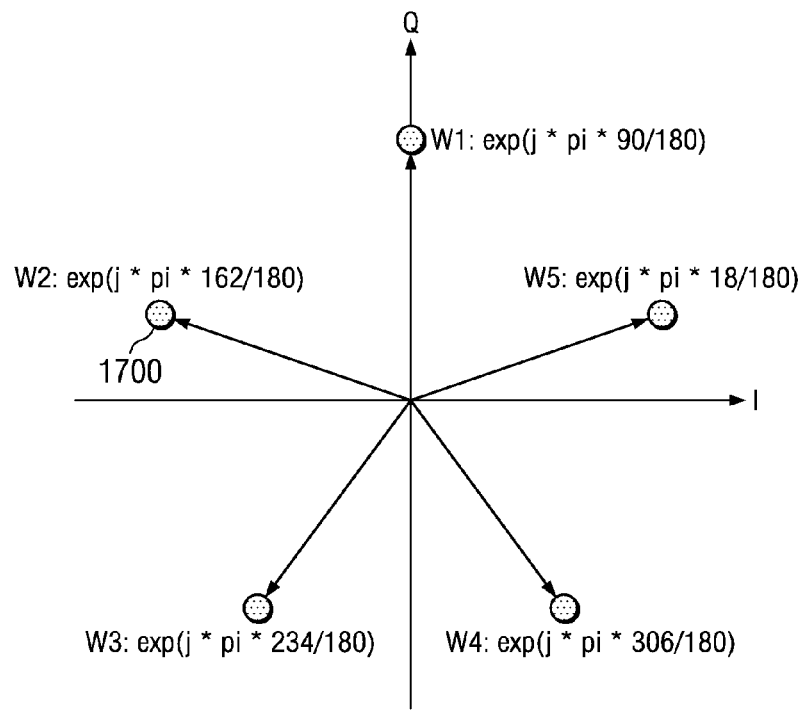
FIG. 17 is an illustration of a mapping of two ACK/NAK Bits and a DTX indicator to a 5PSK constellation.

FIG. 17 is an illustration of a mapping of two ACK/NAK Bits and a DTX indicator to a pentamery phase shift keyed (5PSK) constellation having five constellation points 1700.

Figure 18:
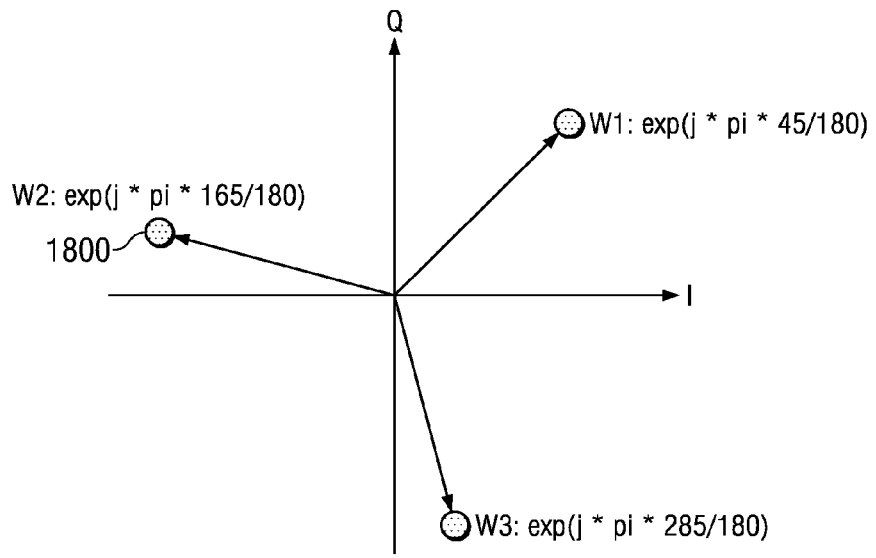
FIG. 18 an illustration of a mapping of one ACK/NAK Bit and a DTX indicator to a 3PSK constellation.

FIG. 18 is an illustration of a mapping of one ACK/NAK Bit and a DTX indicator to a tertiary phased shift keyed (3PSK) constellation having three constellation points 1800.

For two ACK/NAK bits, there are five hypotheses to detect in the receiver side (NodeB), i.e. [DTX], [ACK, ACK], [ACK, NAK], [NAK, ACK], and [NAK, NAK]. For one ACK/NAK bit, there are three hypotheses to detect, i.e. [DTX], [ACK], and [NAK].

TABLE 2

Modulation for 2 ACK/NAK Bits with DTX Detection

|  | Slot 0 | Slot 1 |
|---|---|---|
| [DTX] | $\sqrt{2}/2 + j\sqrt{2}/2$ | $\sqrt{2}/2 + j\sqrt{2}/2$ |
| [NAK, NAK] | $\sqrt{2}/2 + j\sqrt{2}/2$ | $-\sqrt{2}/2 - j\sqrt{2}/2$ |
| [NAK, ACK] | $-\sqrt{2}/2 + j\sqrt{2}/2$ | $\sqrt{2}/2 - j\sqrt{2}/2$ |
| [ACK, ACK] | $-\sqrt{2}/2 - j\sqrt{2}/2$ | $\sqrt{2}/2 + j\sqrt{2}/2$ |
| [ACK, NAK] | $\sqrt{2}/2 - j\sqrt{2}/2$ | $-\sqrt{2}/2 + j\sqrt{2}/2$ |

Table 1 shows an example of the proposed modulation scheme for two ACK/NAK bits with DTX detection. The symbols in Table 1 represent the QPSK symbols, which modulate/multiply the cyclic shifted CAZAC-like sequence in either slot 0 or slot 1. The design principles are:

For DTX, the same QPSK symbol is transmitted in both slots of a subframe;

For the four possibilities of two ACK/NAK bits, i.e. [NAK, NAK], [NAK, ACK], [ACK, ACK], and [ACK, NAK], the QPSK symbol transmitted in the second slot is the negative of the QPSK symbol transmitted in the first slot.

TABLE 3

Modulation for 2 ACK/NAK Bits with DTX Detection

|  | Slot 0 | Slot 1 |
|---|---|---|
| [DTX] | $\sqrt{2}/2 + j\sqrt{2}/2$ | $\sqrt{2}/2 + j\sqrt{2}/2$ |
| [NAK, NAK] | $-\sqrt{2}/2 + j\sqrt{2}/2$ | $\sqrt{2}/2 - j\sqrt{2}/2$ |
| [NAK, ACK] | $-\sqrt{2}/2 - j\sqrt{2}/2$ | $\sqrt{2}/2 + j\sqrt{2}/2$ |
| [ACK, ACK] | $\sqrt{2}/2 - j\sqrt{2}/2$ | $-\sqrt{2}/2 + j\sqrt{2}/2$ |
| [ACK, NAK] | $\sqrt{2}/2 + j\sqrt{2}/2$ | $-\sqrt{2}/2 - j\sqrt{2}/2$ |

TABLE 4

Modulation for 2 ACK/NAK Bits with DTX Detection

|  | Slot 0 | Slot 1 |
|---|---|---|
| [DTX] | $\sqrt{2}/2 + j\sqrt{2}/2$ | $\sqrt{2}/2 + j\sqrt{2}/2$ |
| [NAK, NAK] | $-\sqrt{2}/2 - j\sqrt{2}/2$ | $\sqrt{2}/2 + j\sqrt{2}/2$ |
| [NAK, ACK] | $\sqrt{2}/2 - j\sqrt{2}/2$ | $-\sqrt{2}/2 + j\sqrt{2}/2$ |
| [ACK, ACK] | $\sqrt{2}/2 + j\sqrt{2}/2$ | $-\sqrt{2}/2 - j\sqrt{2}/2$ |
| [ACK, NAK] | $-\sqrt{2}/2 + j\sqrt{2}/2$ | $\sqrt{2}/2 - j\sqrt{2}/2$ |

TABLE 5

Modulation for 2 ACK/NAK Bits with DTX Detection

| | Slot 0 | Slot 1 |
|---|---|---|
| [DTX] | $\sqrt{2}/2 + j\sqrt{2}/2$ | $\sqrt{2}/2 + j\sqrt{2}/2$ |
| [NAK, NAK] | $\sqrt{2}/2 - j\sqrt{2}/2$ | $-\sqrt{2}/2 + j\sqrt{2}/2$ |
| [NAK, ACK] | $\sqrt{2}/2 + j\sqrt{2}/2$ | $-\sqrt{2}/2 - j\sqrt{2}/2$ |
| [ACK, ACK] | $-\sqrt{2}/2 + j\sqrt{2}/2$ | $\sqrt{2}/2 - j\sqrt{2}/2$ |
| [ACK, NAK] | $-\sqrt{2}/2 - j\sqrt{2}/2$ | $\sqrt{2}/2 + j\sqrt{2}/2$ |

Tables 2-4 list other possible modulation schemes for two ACK/NAK bits with DTX detection. Note any common phase rotation can be applied to the proposed modulation (or all QPSK symbols) in Tables 1-4. Alternatively, Tables 5-8 list modulation schemes for two ACK/NAK bits with DTX detection.

TABLE 6

Modulation for 2 ACK/NAK Bits with DTX Detection

| | Slot 0 | Slot 1 |
|---|---|---|
| [DTX] | j | j |
| [NAK, NAK] | $\sqrt{2}/2 + j\sqrt{2}/2$ | $-\sqrt{2}/2 - j\sqrt{2}/2$ |
| [NAK, ACK] | $-\sqrt{2}/2 + j\sqrt{2}/2$ | $\sqrt{2}/2 - j\sqrt{2}/2$ |
| [ACK, ACK] | $-\sqrt{2}/2 - j\sqrt{2}/2$ | $\sqrt{2}/2 + j\sqrt{2}/2$ |
| [ACK, NAK] | $\sqrt{2}/2 - j\sqrt{2}/2$ | $-\sqrt{2}/2 + j\sqrt{2}/2$ |

TABLE 7

Modulation for 2 ACK/NAK Bits with DTX Detection

| | Slot 0 | Slot 1 |
|---|---|---|
| [DTX] | j | j |
| [NAK, NAK] | $-\sqrt{2}/2 + j\sqrt{2}/2$ | $\sqrt{2}/2 - j\sqrt{2}/2$ |
| [NAK, ACK] | $-\sqrt{2}/2 - j\sqrt{2}/2$ | $\sqrt{2}/2 + j\sqrt{2}/2$ |
| [ACK, ACK] | $\sqrt{2}/2 - j\sqrt{2}/2$ | $-\sqrt{2}/2 + j\sqrt{2}/2$ |
| [ACK, NAK] | $\sqrt{2}/2 + j\sqrt{2}/2$ | $-\sqrt{2}/2 - j\sqrt{2}/2$ |

TABLE 8

Modulation for 2 ACK/NAK Bits with DTX Detection

| | Slot 0 | Slot 1 |
|---|---|---|
| [DTX] | j | j |
| [NAK, NAK] | $-\sqrt{2}/2 - j\sqrt{2}/2$ | $\sqrt{2}/2 + j\sqrt{2}/2$ |
| [NAK, ACK] | $\sqrt{2}/2 - j\sqrt{2}/2$ | $-\sqrt{2}/2 + j\sqrt{2}/2$ |
| [ACK, ACK] | $\sqrt{2}/2 + j\sqrt{2}/2$ | $-\sqrt{2}/2 - j\sqrt{2}/2$ |
| [ACK, NAK] | $-\sqrt{2}/2 + j\sqrt{2}/2$ | $\sqrt{2}/2 - j\sqrt{2}/2$ |

TABLE 9

Modulation for 2 ACK/NAK Bits with DTX Detection

| | Slot 0 | Slot 1 |
|---|---|---|
| [DTX] | j | j |
| [NAK, NAK] | $\sqrt{2}/2 - j\sqrt{2}/2$ | $-\sqrt{2}/2 + j\sqrt{2}/2$ |
| [NAK, ACK] | $\sqrt{2}/2 + j\sqrt{2}/2$ | $-\sqrt{2}/2 - j\sqrt{2}/2$ |
| [ACK, ACK] | $-\sqrt{2}/2 + j\sqrt{2}/2$ | $\sqrt{2}/2 - j\sqrt{2}/2$ |
| [ACK, NAK] | $-\sqrt{2}/2 - j\sqrt{2}/2$ | $\sqrt{2}/2 + j\sqrt{2}/2$ |

Moreover, it is possible to design a 5-PSK modulation scheme for two ACK/NAK bits with DTX detection. The 5 PSK symbols are shown in FIG. 17, which illustrates five equal angular symbols for two ACK/NAK Bits with DTX Detection. Some possible mappings between the 5 PSK symbols to the ACK/NAK and DTX hypotheses are listed in Tables 9-12. Other mappings using the 5 PSK symbols in FIG. 17 are not precluded. Any common phase rotation can be applied to the 5 PSK symbols in FIG. 17.

TABLE 10

Modulation for 2 ACK/NAK Bits with DTX Detection

| | Slot 0 | Slot 1 |
|---|---|---|
| [DTX] | W1 | W1 |
| [NAK, NAK] | W2 | W4 |
| [NAK, ACK] | W3 | W5 |
| [ACK, ACK] | W4 | W2 |
| [ACK, NAK] | W5 | W3 |

TABLE 11

Modulation for 2 ACK/NAK Bits with DTX Detection

| | Slot 0 | Slot 1 |
|---|---|---|
| [DTX] | W1 | W1 |
| [NAK, NAK] | W3 | W5 |
| [NAK, ACK] | W4 | W2 |
| [ACK, ACK] | W5 | W3 |
| [ACK, NAK] | W2 | W4 |

TABLE 12

Modulation for 2 ACK/NAK Bits with DTX Detection

| | Slot 0 | Slot 1 |
|---|---|---|
| [DTX] | W1 | W1 |
| [NAK, NAK] | W4 | W2 |
| [NAK, ACK] | W5 | W3 |
| [ACK, ACK] | W2 | W4 |
| [ACK, NAK] | W3 | W5 |

TABLE 13

Modulation for 2 ACK/NAK Bits with DTX Detection

| | Slot 0 | Slot 1 |
|---|---|---|
| [DTX] | W1 | W1 |
| [NAK, NAK] | W5 | W3 |
| [NAK, ACK] | W2 | W4 |
| [ACK, ACK] | W3 | W5 |
| [ACK, NAK] | W4 | W2 |

For one ACK/NAK bit, Tables 12-16 show possible modulation schemes with the same design principle as discussed above.

TABLE 14

Modulation for 1 ACK/NAK Bit with DTX Detection

| | Slot 0 | Slot 1 |
|---|---|---|
| [DTX] | $\sqrt{2}/2 + j\sqrt{2}/2$ | $\sqrt{2}/2 + j\sqrt{2}/2$ |
| [ACK] | $\sqrt{2}/2 + j\sqrt{2}/2$ | $-\sqrt{2}/2 - j\sqrt{2}/2$ |
| [NAK] | $-\sqrt{2}/2 - j\sqrt{2}/2$ | $\sqrt{2}/2 + j\sqrt{2}/2$ |

TABLE 15

Modulation for 1 ACK/NAK Bit with DTX Detection

|  | Slot 0 | Slot 1 |
|---|---|---|
| [DTX] | $\sqrt{2}/2 + j\sqrt{2}/2$ | $\sqrt{2}/2 + j\sqrt{2}/2$ |
| [ACK] | $-\sqrt{2}/2 - j\sqrt{2}/2$ | $\sqrt{2}/2 + j\sqrt{2}/2$ |
| [NAK] | $\sqrt{2}/2 + j\sqrt{2}/2$ | $-\sqrt{2}/2 - j\sqrt{2}/2$ |

TABLE 16

Modulation for 1 ACK/NAK Bit with DTX Detection

|  | Slot 0 | Slot 1 |
|---|---|---|
| [DTX] | $\sqrt{2}/2 + j\sqrt{2}/2$ | $\sqrt{2}/2 + j\sqrt{2}/2$ |
| [ACK] | $-\sqrt{2}/2 + j\sqrt{2}/2$ | $\sqrt{2}/2 - j\sqrt{2}/2$ |
| [NAK] | $\sqrt{2}/2 - j\sqrt{2}/2$ | $-\sqrt{2}/2 + j\sqrt{2}/2$ |

TABLE 17

Modulation for 1 ACK/NAK Bit with DTX Detection

|  | Slot 0 | Slot 1 |
|---|---|---|
| [DTX] | $\sqrt{2}/2 + j\sqrt{2}/2$ | $\sqrt{2}/2 + j\sqrt{2}/2$ |
| [ACK] | $\sqrt{2}/2 - j\sqrt{2}/2$ | $-\sqrt{2}/2 + j\sqrt{2}/2$ |
| [NAK] | $-\sqrt{2}/2 + j\sqrt{2}/2$ | $\sqrt{2}/2 - j\sqrt{2}/2$ |

It is important to keep the same DTX symbols for one and two ACK/NAK bits. In various embodiments, any common phase rotation can be applied to the example modulation (or all QPSK symbols) in Tables 12-16.

Alternatively, for one ACK/NAK bit with DTX detection, the mapping scheme in Tables 17-20 are also applicable, where the symbols W1, W2, and W3 are shown in FIG. 18. Note that W1, W2, and W3 are evenly distributed within the unit circle. Note any common phase rotation can be applied to the example modulation (or all QPSK symbols) in Tables 17-20. Moreover, exp(x) denotes the exponential function of x.

TABLE 18

Alternative Modulation for 1 ACK/NAK Bit with DTX detection

|  | Slot 0 | Slot 1 |
|---|---|---|
| [DTX] | W1 | W1 |
| [ACK] | W2 | W2 |
| [NAK] | W3 | W3 |

TABLE 19

Alternative Modulation for 1 ACK/NAK Bit with DTX detection

|  | Slot 0 | Slot 1 |
|---|---|---|
| [DTX] | W1 | W1 |
| [ACK] | W3 | W3 |
| [NAK] | W2 | W2 |

TABLE 20

Alternative Modulation for 1 ACK/NAK Bit with DTX detection

|  | Slot 0 | Slot 1 |
|---|---|---|
| [DTX] | W1 | W1 |
| [ACK] | W2 | W3 |
| [NAK] | W3 | W2 |

TABLE 21

Alternative Modulation for 1 ACK/NAK Bit with DTX detection

|  | Slot 0 | Slot 1 |
|---|---|---|
| [DTX] | W1 | W1 |
| [ACK] | W3 | W2 |
| [NAK] | W2 | W3 |

Combined ACKNAK and DTX

For ACK/NAK signaling in CQI RS, it is possible to treat DTX as (NAK) or (NAK, NAK). Thus, in another embodiment, BPSK and QPSK modulation can be utilized for one and two ACK/NAK bits, respectively. Again, it is important that the DTX symbol is the same for one and two ACK/NAK bits. Thus, the mapping illustrated in Tables 21 and 22, or Tables 23 and 24, may be used where DTX is treated the same as (NAK) or (NAK, NAK).

TABLE 22

1 ACK/NAK Bit with BPSK

| A/N ($A_1$) | $CS1_{CQIRS}$ Slot 0 | | Slot 1 | |
|---|---|---|---|---|
| | CQI RS 1 | CQI RS 2 | CQI RS 1 | CQI RS 2 |
| (NAK) or DTX | 1 | $\sqrt{2}/2 + j\sqrt{2}/2$ | 1 | $\sqrt{2}/2 + j\sqrt{2}/2$ |
| (ACK) | 1 | $-\sqrt{2}/2 - j\sqrt{2}/2$ | 1 | $-\sqrt{2}/2 - j\sqrt{2}/2$ |

TABLE 23

2 ACK/NAK Bits with QPSK

| A/N ($A_1A_2$) | $CS1_{CQIRS}$ Slot 0 | | Slot 1 | |
|---|---|---|---|---|
| | CQI RS 1 | CQI RS 2 | CQI RS 1 | CQI RS 2 |
| (NAK, NAK) or DTX | 1 | $\sqrt{2}/2 + j\sqrt{2}/2$ | 1 | $\sqrt{2}/2 + j\sqrt{2}/2$ |
| (NAK, ACK) | 1 | $\sqrt{2}/2 - j\sqrt{2}/2$ | 1 | $\sqrt{2}/2 - j\sqrt{2}/2$ |
| (ACK, NAK) | 1 | $-\sqrt{2}/2 + j\sqrt{2}/2$ | 1 | $-\sqrt{2}/2 + j\sqrt{2}/2$ |
| (ACK, ACK) | 1 | $-\sqrt{2}/2 - j\sqrt{2}/2$ | 1 | $-\sqrt{2}/2 - j\sqrt{2}/2$ |

TABLE 24

1 ACK/NAK Bit with BPSK

| | $CS1_{CQIRS}$ | | | |
| --- | --- | --- | --- | --- |
| | Slot 0 | | Slot 1 | |
| A/N ($A_1$) | CQI RS 1 | CQI RS 2 | CQI RS 1 | CQI RS 2 |
| (NAK) or DTX | 1 | 1 | 1 | 1 |
| (ACK) | 1 | −1 | 1 | −1 |

TABLE 25

2 ACK/NAK Bits with QPSK

| | $CS1_{CQIRS}$ | | | |
| --- | --- | --- | --- | --- |
| | Slot 0 | | Slot 1 | |
| A/N ($A_1 A_2$) | CQI RS 1 | CQI RS 2 | CQI RS 1 | CQI RS 2 |
| (NAK, NAK) or DTX | 1 | 1 | 1 | 1 |
| (NAK, ACK) | 1 | j | 1 | j |
| (ACK, NAK) | 1 | −j | 1 | −j |
| (ACK, ACK) | 1 | −1 | 1 | −1 |

Any rotations to the symbols (or subset of the symbols) in Tables 21-24 are applicable, as long as the DTX symbol remains the same for the one and two ACK/NAK bits.

System Examples

Figure 19:
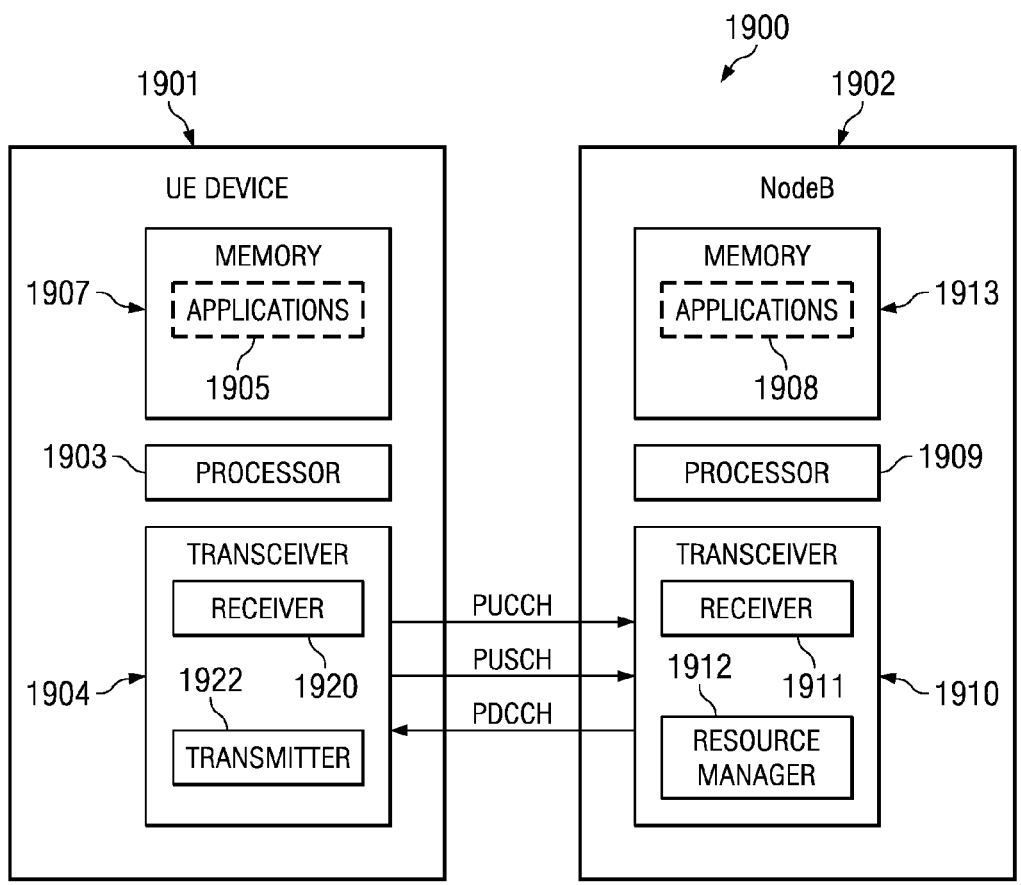
FIG. 19 is a block diagram of a Node B and a User Equipment for use in the network system of FIG. 1.

FIG. 19 is a block diagram illustrating operation of an eNB and a mobile UE in the network system of FIG. 1. As shown in FIG. 19, wireless networking system 1900 comprises a mobile UE device 1901 in communication with an eNB 1902. The mobile UE device 1901 may represent any of a variety of devices such as a server, a desktop computer, a laptop computer, a cellular phone, a Personal Digital Assistant (PDA), a smart phone or other electronic devices. In some embodiments, the electronic mobile UE device 1901 communicates with the eNB 1902 based on a LTE or E-UTRAN protocol. Alternatively, another communication protocol now known or later developed can be used.

As shown, the mobile UE device 1901 comprises a processor 1903 coupled to a memory 1907 and a Transceiver 1904. The memory 1907 stores (software) applications 1905 for execution by the processor 1903. The applications 1905 could comprise any known or future application useful for individuals or organizations. As an example, such applications 1905 could be categorized as operating systems (OS), device drivers, databases, multimedia tools, presentation tools, Internet browsers, e-mailers, Voice-Over-Internet Protocol (VOIP) tools, file browsers, firewalls, instant messaging, finance tools, games, word processors or other categories. Regardless of the exact nature of the applications 1905, at least some of the applications 1905 may direct the mobile UE device 1901 to transmit UL signals to the eNB (base-station) 1902 periodically or continuously via the transceiver 1904. In at least some embodiments, the mobile UE device 1901 identifies a Quality of Service (QoS) requirement when requesting an uplink resource from the eNB 1902. In some cases, the QoS requirement may be implicitly derived by the eNB 1902 from the type of traffic supported by the mobile UE device 1901. As an example, VOIP and gaming applications often involve low-latency uplink (UL) transmissions while High Throughput (HTP)/Hypertext Transmission Protocol (HTTP) traffic can involve high-latency uplink transmissions.

Transceiver 1904 includes uplink logic which may be implemented by execution of instructions that control the operation of the transceiver. Some of these instructions may be stored in memory 1907 and executed when needed. As would be understood by one of skill in the art, the components of the Uplink Logic may involve the physical (PHY) layer and/or the Media Access Control (MAC) layer of the transceiver 1904. Transceiver 1904 includes one or more receivers 1920 and one or more transmitters 1922. The transmitter(s) may be embodied as described with respect to FIGS. 2-18. In particular, as described above, a transmission signal comprises at least one data symbol and at least one RS symbol. An exemplary transmission signal comprising five data symbols and two RS symbols is shown in FIG. 2. The first type of information is transmitted in at least one data symbol, and the second type of information is transmitted in at least one RS symbol. In this embodiment, the first type of information is a channel quality indicator (CQI) and the second type of information is an ACKNAK response. The CQI is firstly mapped to a number of constellation points, e.g. according to a quadrature amplitude modulation (QAM) mapping scheme. The constellation points mapped from the CQI are then transmitted on the data symbols, by modulating/multiplying each data symbol with a corresponding constellation point. CQI includes, but not limited to Rank Indicator (RI), Precoding Matrix Indicator (PMI), Modulation and Coding Scheme (MCS), or combinations thereof.

The ACKNAK response is firstly mapped to a constellation point, e.g. according to a quadrature amplitude modulation mapping scheme. The constellation point mapped from the ACKNAK response is transmitted in the second RS symbol by modulating/multiplying the reference signal with the constellation point. A pre-defined reference signal is transmitted in the first RS symbol. It is not precluded that a transmission signal can comprise more than two RS symbols, where the ACKNAK response is transmitted in a subset of the RS symbols and pre-defined reference signals are transmitted in the rest RS symbols. The pre-defined reference signal transmitted in each RS symbol can be the same. Alternatively, the pre-defined reference signals can be different in different RS symbols, provided these pre-defined reference signals are known to both the transmitter and the receiver.

As shown in FIG. 19, the eNB 1902 comprises a Processor 1909 coupled to a memory 1913 and a transceiver 1910. The memory 1913 stores applications 1908 for execution by the processor 1909. The applications 1908 could comprise any known or future application useful for managing wireless communications. At least some of the applications 1908 may direct the base-station to manage transmissions to or from the user device 1901.

Transceiver 1910 comprises an uplink Resource Manager 1912, which enables the eNB 1902 to selectively allocate uplink PUSCH resources to the user device 1901. As would be understood by one of skill in the art, the components of the uplink resource manager 1912 may involve the physical (PHY) layer and/or the Media Access Control (MAC) layer of the transceiver 1910. Transceiver 1910 includes a Receiver 1911 for receiving transmissions from various UE within range of the eNB and transmitters for transmitting data and control information to the various UE within range of the eNB.

Uplink resource manager 1912 executes instructions that control the operation of transceiver 1910. Some of these instructions may be located in memory 1913 and executed when needed. Resource manager 1912 controls the transmission resources allocated to each UE that is being served by eNB 1902 and broadcasts control information via the physical downlink control channel PDCCH. In particular, for the transmission of ACK/NAK, eNB 1902 arranges the cyclic shifted base sequences in the time-frequency resource, as described above. The Node-B can have prior knowledge on whether ACKNAK bits are expected in the second CQI RS or not. If the Node-B knows there are no ACK/NAK bits in the second CQI RS, then it demodulates the second CQI RS by the "NAK, NAK" or "NAK" QAM symbol to provide channel estimation for coherent demodulation of the CQI data symbols. If the Node-B expects ACKNAK bits in the second CQI RS, then it decodes the QAM symbol carried in the second CQI RS with the channel estimation obtained from the first CQI RS. Further, after ACKNAK demodulation and decoding on the second CQI RS, the second RS can also serve as a channel estimate for CQI data symbols, as described in more detail above.

Figure 20:
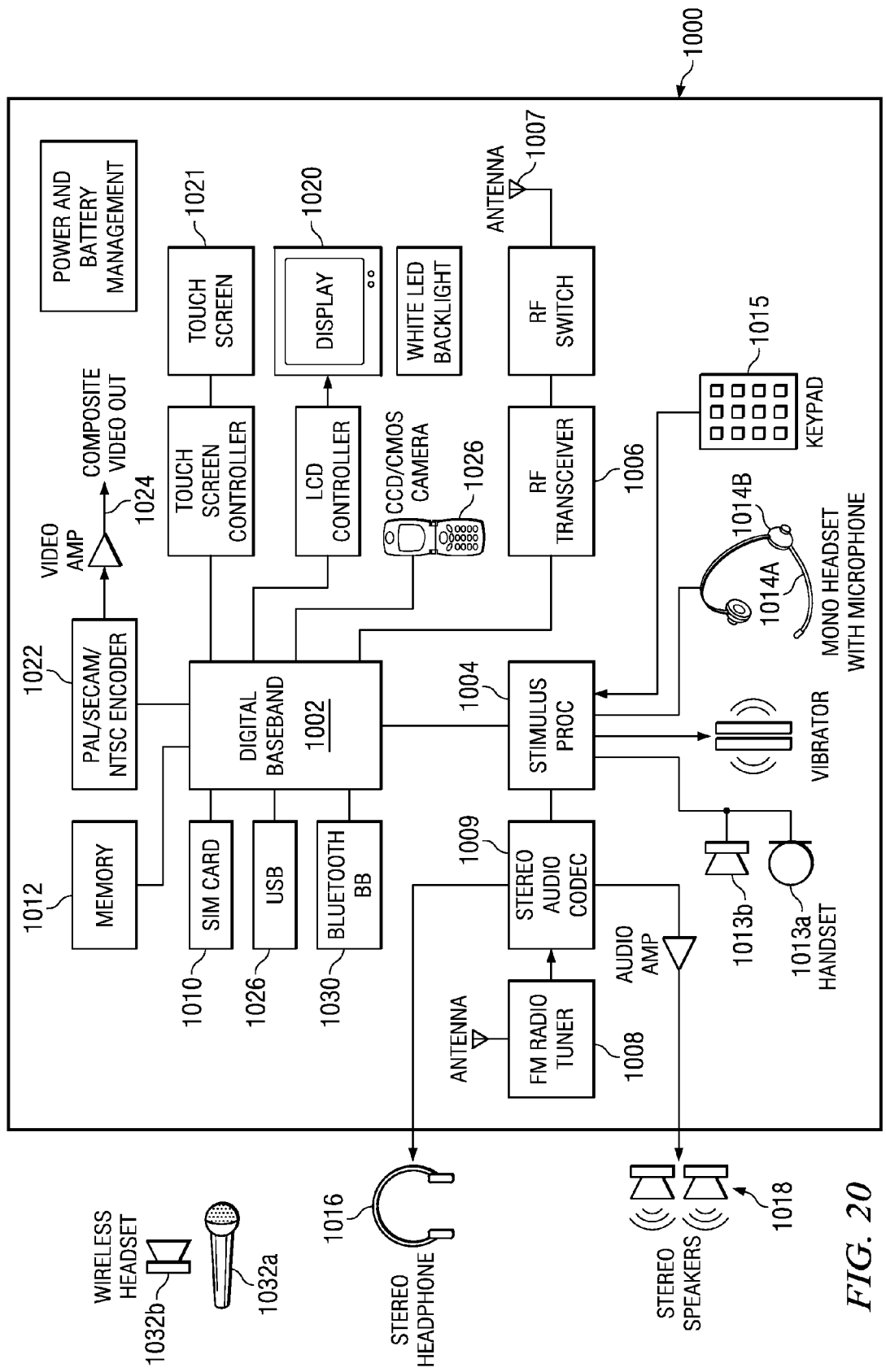
FIG. 20 is a block diagram of a cellular phone for use in the network of FIG. 1.

FIG. 20 is a block diagram of mobile cellular phone 1000 for use in the network of FIG. 1. Digital baseband (DBB) unit 1002 can include a digital processing processor system (DSP) that includes embedded memory and security features. Stimulus Processing (SP) unit 1004 receives a voice data stream from handset microphone 1013*a* and sends a voice data stream to handset mono speaker 1013*b*. SP unit 1004 also receives a voice data stream from microphone 1014*a* and sends a voice data stream to mono headset 1014*b*. Usually, SP and DBB are separate ICs. In most embodiments, SP does not embed a programmable processor core, but performs processing based on configuration of audio paths, filters, gains, etc being setup by software running on the DBB. In an alternate embodiment, SP processing is performed on the same processor that performs DBB processing. In another embodiment, a separate DSP or other type of processor performs SP processing.

RF transceiver 1006 includes a receiver for receiving a stream of coded data frames and commands from a cellular base station via antenna 1007 and a transmitter for transmitting a stream of coded data frames to the cellular base station via antenna 1007. Transmission of the PUSCH data is performed by the transceiver using the PUSCH resources designated by the serving eNB. In some embodiments, frequency hopping may be implied by using two or more bands as commanded by the serving eNB. In this embodiment, a single transceiver can support multi-standard operation (such as EUTRA and other standards) but other embodiments may use multiple transceivers for different transmission standards. Other embodiments may have transceivers for a later developed transmission standard with appropriate configuration. RF transceiver 1006 is connected to DBB 1002 which provides processing of the frames of encoded data being received and transmitted by the mobile UE unite 1000.

The EUTRA defines SC-FDMA (via DFT-spread OFDMA) as the uplink modulation. The basic SC-FDMA DSP radio can include discrete Fourier transform (DFT), resource (i.e. tone) mapping, and IFFT (fast implementation of IDFT) to form a data stream for transmission. To receive the data stream from the received signal, the SC-FDMA radio can include DFT, resource de-mapping and IFFT. The operations of DFT, IFFT and resource mapping/de-mapping may be performed by instructions stored in memory 1012 and executed by DBB 1002 in response to signals received by transceiver 1006.

For ACK/NAK transmission, a transmitter(s) within transceiver 1006 may be embodied as described with respect to FIGS. 2-18. In particular, as described above, for the transmission of ACK/NAK a transmission signal may comprise at least one data symbol and at least one RS symbol. An exemplary transmission signal comprising five data symbols and two RS symbols is shown in FIG. 2. The first type of information is transmitted in at least one data symbol, and the second type of information is transmitted in at least one RS symbol. In this embodiment, the first type of information is a channel quality indicator (CQI) and the second type of information is an ACKNAK response. The CQI is firstly mapped to a number of constellation points, e.g. according to a quadrature amplitude modulation (QAM) mapping scheme. The constellation points mapped from the CQI are then transmitted on the data symbols, by modulating/multiplying each data symbol with a corresponding constellation point. CQI includes, but not limited to Rank Indicator (RI), Precoding Matrix Indicator (PMI), Modulation and Coding Scheme (MCS), or combinations thereof.

The ACKNAK response is firstly mapped to a constellation point, e.g. according to a quadrature amplitude modulation mapping scheme. The constellation point mapped from the ACKNAK response is transmitted in the second RS symbol by modulating/multiplying the reference signal with the constellation point. A pre-defined reference signal is transmitted in the first RS symbol. It is not precluded that a transmission signal can comprise more than two RS symbols, where the ACKNAK response is transmitted in a subset of the RS symbols and pre-defined reference signals are transmitted in the rest RS symbols. The pre-defined reference signal transmitted in each RS symbol can be the same. Alternatively, the pre-defined reference signals can be different in different RS symbols, provided these pre-defined reference signals are known to both the transmitter and the receiver.

DBB unit 1002 may send or receive data to various devices connected to universal serial bus (USB) port 1026. DBB 1002 can be connected to subscriber identity module (SIM) card 1010 and stores and retrieves information used for making calls via the cellular system. DBB 1002 can also connected to memory 1012 that augments the onboard memory and is used for various processing needs. DBB 1002 can be connected to Bluetooth baseband unit 1030 for wireless connection to a microphone 1032*a* and headset 1032*b* for sending and receiving voice data. DBB 1002 can also be connected to display 1020 and can send information to it for interaction with a user of the mobile UE 1000 during a call process. Display 1020 may also display pictures received from the network, from a local camera 1026, or from other sources such as USB 1026. DBB 1002 may also send a video stream to display 1020 that is received from various sources such as the cellular network via RF transceiver 1006 or camera 1026. DBB 1002 may also send a video stream to an external video display unit via encoder 1022 over composite output terminal 1024. Encoder unit 1022 can provide encoding according to PAL/SECAM/NTSC video standards.

As used herein, the terms "applied," "coupled," "connected," and "connection" mean electrically connected, including where additional elements may be in the electrical connection path. "Associated" means a controlling relationship, such as a memory resource that is controlled by an associated port. While the invention has been described with reference to illustrative embodiments, this description is not intended to be construed in a limiting sense. Various other embodiments of the invention will be apparent to persons skilled in the art upon reference to this description. For example, a larger or smaller number of symbols then described herein may be used in a slot.

FIGS. 2-18 illustrate various embodiments and various modes of operation. A particular embodiment may be arranged to perform all or a portion of the various modes illustrated in FIGS. 2-18.

It is therefore contemplated that the appended claims will cover any such modifications of the embodiments as fall within the true scope and spirit of the invention.

What is claimed is:

1. An apparatus for transmitting in a wireless cellular network, comprising:
    generating circuitry for forming a plurality of data symbols using a first type of information;
    generating circuitry for forming at least one reference symbol using a pre-defined reference signal;
    producing circuitry coupled to the generating circuitry and operable to determine if a second type of information consisting of an ACKNAK response is expected, and operable to produce a signal comprising the plurality of data symbols and the at least one reference symbol, wherein if the second type of information consisting of an ACKNAK response is expected, then the second type of information consisting of a 1-bit ACKNAK response is embedded in at least one said reference symbol by:
        mapping the generated 1-bit ACKNAK response into at least one symbol according to a constellation mapping scheme comprising two constellation points, wherein a 1-bit "ACK" response is mapped to a first constellation point, wherein a 1-bit "NAK" response is mapped to a second constellation point; and
        modulating the pre-defined reference signal in the at least one reference symbol with the symbol mapped from the 1-bit ACKNAK response; and
    transmitter circuitry coupled to the producing circuitry operable to transmit the produced signal.

2. The apparatus of claim 1, wherein if the second type of information is not expected, then a discontinuous transmission (DTX) symbol is embedded in the at least one said reference symbol in place of the second type of information.

3. An apparatus for transmitting in a wireless cellular network, comprising:
    generating circuitry for forming a plurality of data symbols using a first type of information;
    generating circuitry for forming at least one reference symbol using a pre-defined reference signal;
    producing circuitry coupled to the generating circuitry and operable to determine if a second type of information consisting of an ACKNAK response is expected, and operable to produce a signal comprising the plurality of data symbols and the at least one reference symbol, wherein if the second type of information consisting of an ACKNAK response is expected, then the second type of information consisting of a 2-bit ACKNAK response is embedded in at least one said reference symbol by:
        mapping the generated 2-bit ACKNAK response into at least one symbol according to a constellation mapping scheme comprising four constellation points, wherein a 2-bit "ACK, ACK" response is mapped to a first constellation point, wherein a 2-bit "ACK, NAK" response is mapped to a second constellation point, wherein a 2-bit "NAK, ACK" response is mapped to a third constellation point, wherein a 2-bit "NAK, NAK" response is mapped to a fourth constellation point,
        modulating the pre-defined reference signal in the at least one reference symbol with the symbol mapped from the 2-bit ACKNAK response,
    if the second type of information is not expected, then a discontinuous transmission (DTX) symbol is embedded in the at least one said reference symbol in place of the second type of information; and
    transmitter circuitry coupled to the producing circuitry operable to transmit the produced signal.

4. An apparatus for transmitting in a wireless cellular network, comprising:
    generating circuitry for forming a plurality of data symbols using a first type of information;
    generating circuitry for forming at least one reference symbol using a pre-defined reference signal;
    producing circuitry coupled to the generating circuitry and operable to determine if a second type of information consisting of an ACKNAK response is expected, and operable to produce a signal comprising the plurality of data symbols and the at least one reference symbol, wherein if the second type of information consisting of an ACKNAK response is expected, then the second type of information consisting of a 1-bit ACKNAK response is embedded in at least one said reference symbol by:
        mapping the generated 1-bit ACKNAK response into at least one symbol according to a constellation mapping scheme comprising two constellation points, wherein a 1-bit "ACK" response is mapped to a first constellation point, wherein a 1-bit "NAK" response is mapped to a second constellation point, wherein a discontinuous transmission "DTX" response is mapped to same constellation point as the 1-bit "NAK" response, and
        modulating the pre-defined reference signal in the at least one reference symbol with the symbol formed by said mapping,
    if the second type of information is not expected, then a discontinuous transmission (DTX) symbol is embedded in the at least one said reference symbol in place of the second type of information; and
    transmitter circuitry coupled to the producing circuitry operable to transmit the produced signal.

5. An apparatus for transmitting in a wireless cellular network, comprising:
    generating circuitry for forming a plurality of data symbols using a first type of information;
    generating circuitry for forming at least one reference symbol using a pre-defined reference signal;
    producing circuitry coupled to the generating circuitry and operable to determine if a second type of information consisting of an ACKNAK response is expected, and operable to produce a signal comprising the plurality of data symbols and the at least one reference symbol, wherein if the second type of information consisting of an ACKNAK response is expected, then the second type of information consisting of a 2-bit ACKNAK response is embedded in at least one said reference symbol by:
        mapping the generated 2-bit ACKNAK response into at least one symbol according to a constellation mapping scheme comprising four constellation points, wherein a 2-bit "ACK, ACK" response is mapped to a first constellation point, wherein a 2-bit "ACK, NAK" response is mapped to a second constellation point, wherein a 2-bit "NAK, ACK" response is mapped to a third constellation point, wherein a 2-bit "NAK, NAK" response is mapped to a fourth constellation point, wherein a discontinuous transmission "DTX" response is mapped to the same constellation point as the 2-bit "NAK, NAK" response, and modulating the pre-defined reference signal in the at least one reference symbol with the symbol formed by said mapping, if the second type of information is not expected, then a discontinuous transmission (DTX) symbol is embedded in the at least one said reference symbol in place of the second type of information; and transmitter circuitry coupled to the producing circuitry operable to transmit the produced signal.

6. An apparatus for transmitting in a wireless cellular network, comprising:

generating circuitry for forming a plurality of data symbols using a first type of information;

generating circuitry for forming at least one reference symbol using a pre-defined reference signal;

producing circuitry coupled to the generating circuitry and operable to determine if a second type of information consisting of an ACKNAK response is expected, and operable to produce a signal comprising the plurality of data symbols and the at least one reference symbol, wherein if the second type of information consisting of an ACKNAK response is expected, then the second type of information consisting of a 1-bit ACKNAK response is embedded in at least one said reference symbol by:

mapping the generated 1-bit ACKNAK response into at least one symbol according to a constellation mapping scheme comprising three constellation points, wherein a 1-bit "ACK" response is mapped to a first constellation point, wherein a 1-bit "NAK" response is mapped to a second constellation point, wherein a discontinuous transmission "DTX" response is mapped to a third constellation point, and modulating the pre-defined reference signal in the at least one reference symbol with the symbol formed by said mapping, if the second type of information is not expected, then a discontinuous transmission (DTX) symbol is embedded in the at least one said reference symbol in place of the second type of information; and transmitter circuitry coupled to the producing circuitry operable to transmit the produced signal.

7. An apparatus for transmitting in a wireless cellular network, comprising:

generating circuitry for forming a plurality of data symbols using a first type of information;

generating circuitry for forming at least one reference symbol using a pre-defined reference signal;

producing circuitry coupled to the generating circuitry and operable to determine if a second type of information consisting of an ACKNAK response is expected, and operable to produce a signal comprising the plurality of data symbols and the at least one reference symbol, wherein if the second type of information consisting of an ACKNAK response is expected, then the second type of information consisting of a 2-bit ACKNAK response is embedded in at least one said reference symbol by:

mapping the generated 2-bit ACKNAK response into at least one symbol according to a constellation mapping scheme comprising five constellation points, wherein a 2-bit "ACK, ACK" response is mapped to a first constellation point, wherein a 2-bit "ACK, NAK" response is mapped to a second constellation point, wherein a 2-bit "NAK, ACK" response is mapped to a third constellation point, wherein a 2-bit "NAK, NAK" response is mapped to a fourth constellation point, wherein a discontinuous transmission "DTX" response is mapped to a fifth constellation point, and modulating the pre-defined reference signal in the at least one reference symbol with the symbol formed by said mapping, if the second type of information is not expected, then a discontinuous transmission (DTX) symbol is embedded in the at least one said reference symbol in place of the second type of information; and transmitter circuitry coupled to the producing circuitry operable to transmit the produced signal.

8. An apparatus for transmitting in a wireless cellular network, comprising:

generating circuitry for forming a plurality of data symbols using a first type of information;

generating circuitry for forming at least one reference symbol using a pre-defined reference signal;

producing circuitry coupled to the generating circuitry and operable to determine if a second type of information is expected, and operable to produce a signal comprising the plurality of data symbols and the at least one reference symbol, wherein if the second type of information is expected, then the second type of information is embedded in at least one said reference symbol by modulating the pre-defined reference signal;

transmitter circuitry coupled to the producing circuitry operable to transmit a subframe comprising formed data symbols and reference symbols to a receiver;

wherein each symbol confines to an orthogonal frequency division multiplexing (OFDM) symbol;

wherein transmitting the subframe lasts for a duration which is an integral multiple of 0.5 ms slots;

wherein each 0.5 ms slot comprises five data symbols and two reference symbols; wherein the first type of information is a channel quality indicator (CQI) and the second type of information is a 1-bit ACKNAK response;

wherein forming a plurality of data symbols using the first type of information comprises mapping the CQI to produce five QPSK symbols per slot; and modulating each R-th data symbol by producing a first sequence and multiplying the entire first sequence with the R-th QPSK symbol mapped from the first type of information; and wherein embedding the second type of information in a second reference symbol of the two reference symbols comprises:

mapping the 1-bit ACKNAK response into at least one BPSK symbol according to a BPSK constellation mapping scheme comprising two constellation points, quadrature amplitude modulating the second reference symbol by producing a second sequence and multiplying the entire second sequence with one BPSK symbol mapped from the second type of information, wherein a 1-bit "ACK" response is mapped to a first BPSK constellation point, and wherein a 1-bit "NAK" response is mapped to a second BPSK constellation point.

9. An apparatus for transmitting in a wireless cellular network, comprising:

generating circuitry for forming a plurality of data symbols using a first type of information;

generating circuitry for forming at least one reference symbol using a pre-defined reference signal;

producing circuitry coupled to the generating circuitry and operable to determine if a second type of information is expected, and operable to produce a signal comprising the plurality of data symbols and the at least one reference symbol, wherein if the second type of information is expected, then the second type of information is embedded in at least one said reference symbol;

wherein each symbol confines to an orthogonal frequency division multiplexing (OFDM) symbol; transmitter circuitry coupled to the producing circuitry operable to transmit a subframe comprising formed data symbols and reference symbols to a receiver;

wherein transmitting the subframe lasts for a duration which is an integral multiple of 0.5 ms slots;

wherein each 0.5 ms slot comprises five data symbols and two reference symbols; wherein the first type of information is a channel quality indicator (CQI) and the second type of information is a 2-bit ACKNAK response;

wherein forming a plurality of data symbols using the first type of information comprises mapping the CQI to produce five QPSK symbols per slot;

modulating each R-th data symbol by producing a first sequence and multiplying the entire first sequence with the R-th QPSK symbol mapped from the first type of information; and wherein embedding the second type of information in a second reference symbol of the two reference symbols comprises:
  mapping the 2-bit ACKNAK response into at least one QPSK symbol according to a QPSK constellation mapping scheme comprising four constellation points,
  quadrature amplitude modulating the second reference symbol by producing a second sequence and multiplying the entire second sequence with one QPSK symbol mapped from the second type of information,
  wherein a 2-bit "ACK, ACK" response is mapped to a first QPSK constellation point,
  wherein a 2-bit "ACK, NAK" response is mapped to a second QPSK constellation point, and
  wherein a 2-bit "NAK, ACK" response is mapped to a third QPSK constellation point; and wherein a 2-bit "NAK, NAK" response is mapped to a fourth QPSK constellation point,
transmitter circuitry coupled to the producing circuitry operable to transmit the produced signal.

* * * * *